US009237050B2

United States Patent
Kolze

(10) Patent No.: US 9,237,050 B2
(45) Date of Patent: Jan. 12, 2016

(54) HIGH PEAK TO AVERAGE POWER RATIO (PAPR) MITIGATION IN HIGH SPEED DATA NETWORKS USING SYMBOL MAPPING ADJUSTMENT

(75) Inventor: Thomas Kolze, Phoenix, AZ (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/436,069

(22) Filed: Mar. 30, 2012

(65) Prior Publication Data

US 2012/0294346 A1 Nov. 22, 2012

Related U.S. Application Data

(60) Provisional application No. 61/488,298, filed on May 20, 2011.

(51) Int. Cl.
*H04K 1/10* (2006.01)
*H04L 27/26* (2006.01)
*H04L 27/34* (2006.01)

(52) U.S. Cl.
CPC ........ *H04L 27/2614* (2013.01); *H04L 27/3411* (2013.01)

(58) Field of Classification Search
None
See application file for complete search history.

(56) References Cited

U.S. PATENT DOCUMENTS

| 5,606,578 | A | | 2/1997 | O'Dea |
| 6,101,217 | A | * | 8/2000 | Gut ............................. 375/222 |
| 6,463,094 | B2 | * | 10/2002 | Koifman et al. .............. 375/222 |
| 7,505,531 | B1 | | 3/2009 | Pasternak et al. |
| 8,406,635 | B2 | * | 3/2013 | Nakashima et al. .......... 398/158 |
| 8,571,423 | B2 | * | 10/2013 | Winzer ......................... 398/208 |
| 2004/0086054 | A1 | | 5/2004 | Corral |
| 2007/0217329 | A1 | | 9/2007 | Abedi |
| 2009/0129484 | A1 | | 5/2009 | He et al. |
| 2009/0161799 | A1 | | 6/2009 | Fisher-Jeffes |
| 2010/0329401 | A1 | | 12/2010 | Terry |
| 2011/0206207 | A1 | | 8/2011 | Priotti |
| 2012/0213255 | A1 | | 8/2012 | Stadelmeier et al. |
| 2012/0275446 | A1 | | 11/2012 | Stacey et al. |
| 2012/0294345 | A1 | | 11/2012 | Kolze |
| 2012/0320845 | A1 | | 12/2012 | Choi et al. |

OTHER PUBLICATIONS

"Series J: Cable Networks and Transmission of Television, Sound Programme and Other Multimedia Signal—Digital Transmission of Television Signals—Digital Multi-Programme Systems for Television, Sound and Data Services for Cable Distribution," Recommendation ITU-T J.83, International Telecommunications Union, Geneva, Switzerland, Dec. 2007.

Al-Shaiki, et al., "Alternative Symbol Representations with Radial Symmentry for PAPR Reduction in OFDM Systems," IEEE International Conference on Communications, 2007, pp. 2942-2948.

* cited by examiner

*Primary Examiner* — Adolf Dsouza
(74) *Attorney, Agent, or Firm* — Sterne, Kessler, Goldstein & Fox PLLC

(57) ABSTRACT

Embodiments provide techniques for high peak to average power ratio (PAPR) event mitigation in high speed data networks, such as cable networks, for example. Embodiments are applicable to multi-carrier and single-carrier modulation systems. Embodiments operate by predicting or detecting the occurrence of a peaking event at the transmitter, and then mitigating potential effects of the peaking event at the transmitter, including application of alternative constellation symbol mappings.

20 Claims, 24 Drawing Sheets

US 9,237,050 B2

HIGH PEAK TO AVERAGE POWER RATIO (PAPR) MITIGATION IN HIGH SPEED DATA NETWORKS USING SYMBOL MAPPING ADJUSTMENT

CROSS-REFERENCE TO RELATED APPLICATION(S)

The present application claims the benefit of U.S. Provisional Application No. 61/488,298, filed May 20, 2011, entitled "High Peak to Average Power Ratio (PAPR) Mitigation in High Speed Data Networks," which is incorporated herein by reference in its entirety.

BACKGROUND

1. Field of the Invention

The present invention relates generally to high speed data networks, including, but not limited to, wired, wireless, microwave, WiFi, satellite, cable, telecommunications, cellular, Local Area Network (LAN), Wide Area Network (WAN), Metropolitan Area Network (MAN), terrestrial, and broadcast networks.

2. Background Art

There is a need for high peak to average power ratio (PAPR) mitigation techniques in high speed data networks, including, but not limited to, wired, wireless, microwave, WiFi, satellite, cable, telecommunications, cellular, LAN, WAN, MAN, terrestrial, and broadcast networks.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 11A:
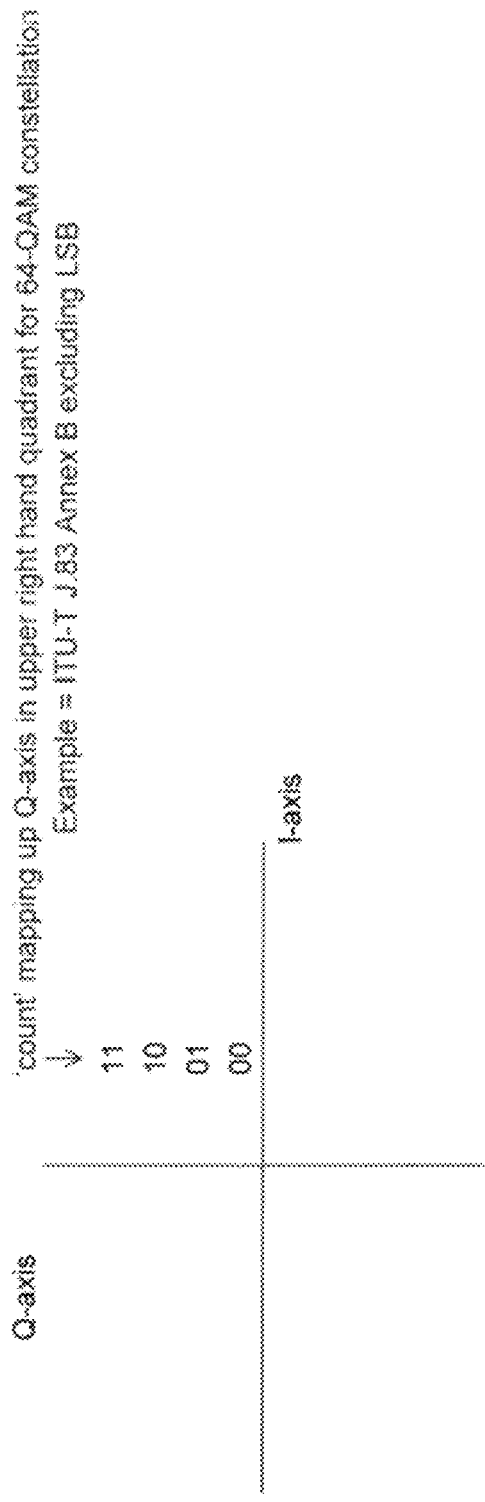
Figure 11B:
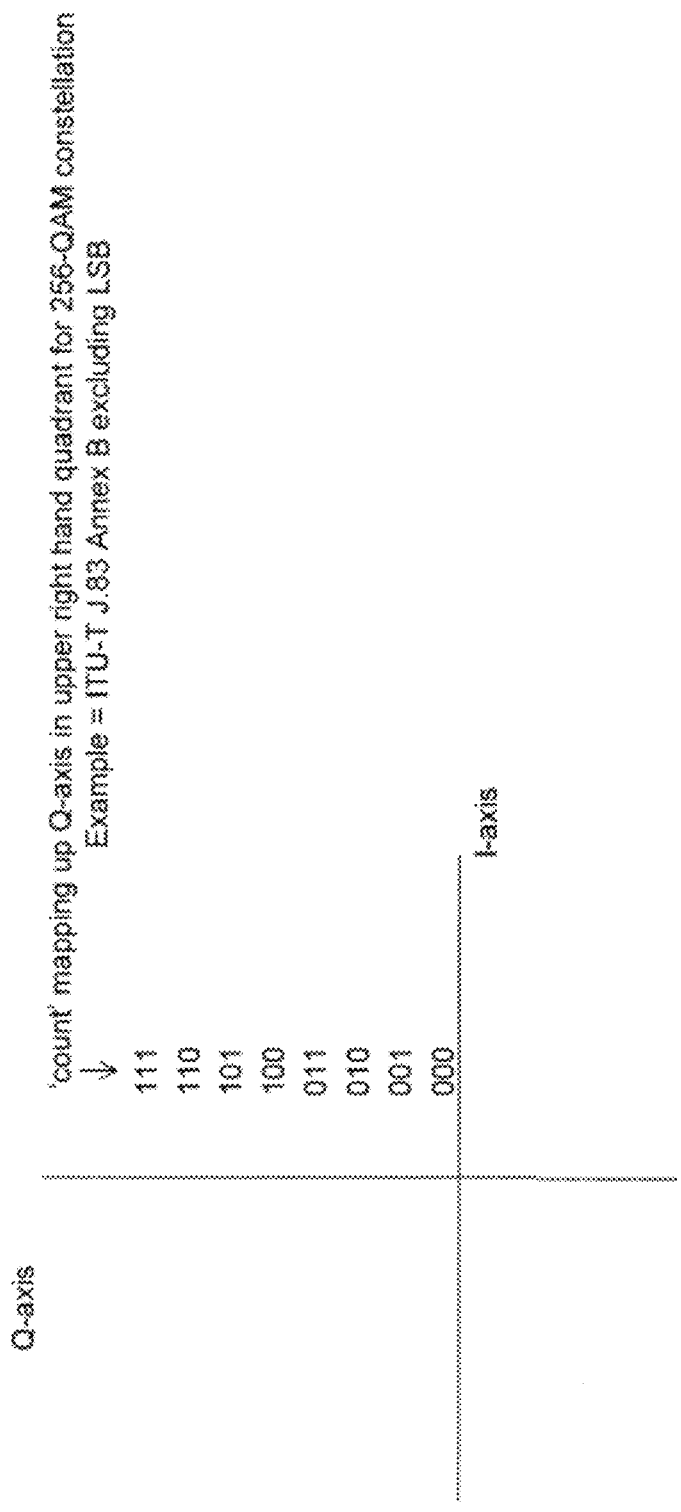
Figure 11C:
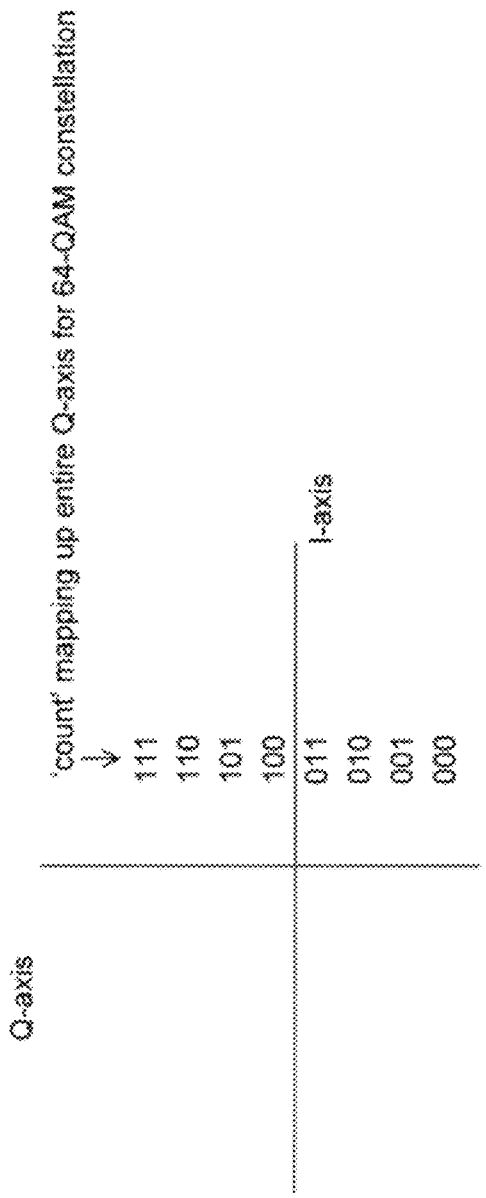

FIGS. 11A-C illustrate example constellations that may be used in embodiments of the present invention.

Figure 12A:
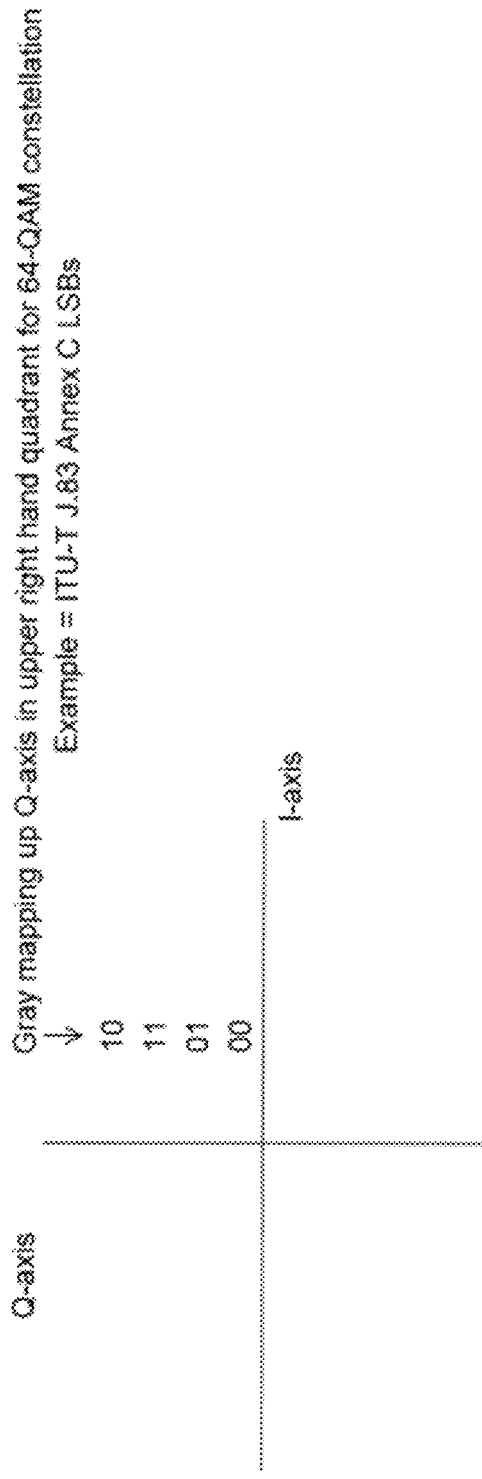
Figure 12B:
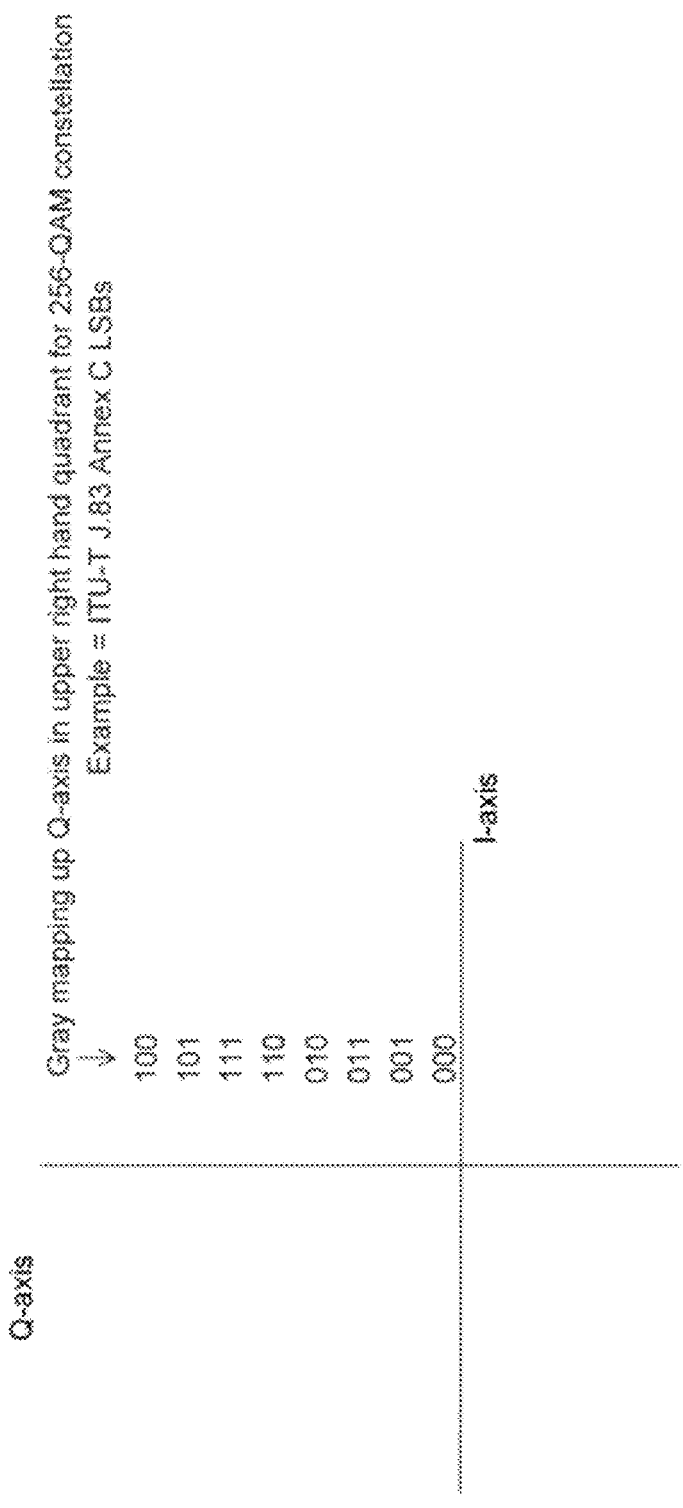
Figure 12C:
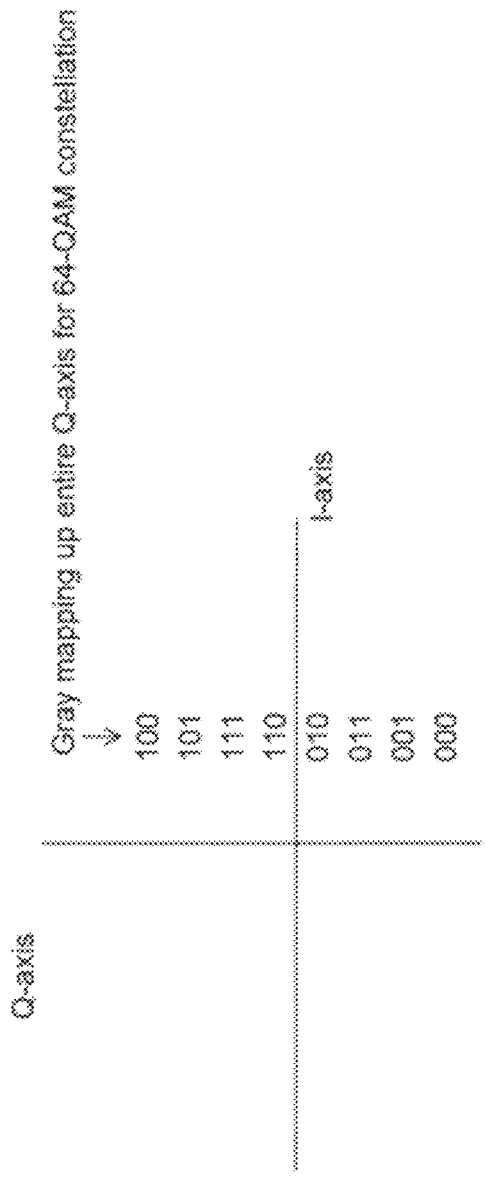

FIGS. 12A-C illustrate example constellations that may be used in embodiments of the present invention.

FIGS. 13A-D illustrate example applications of embodiments of the present invention.

Figure 14:
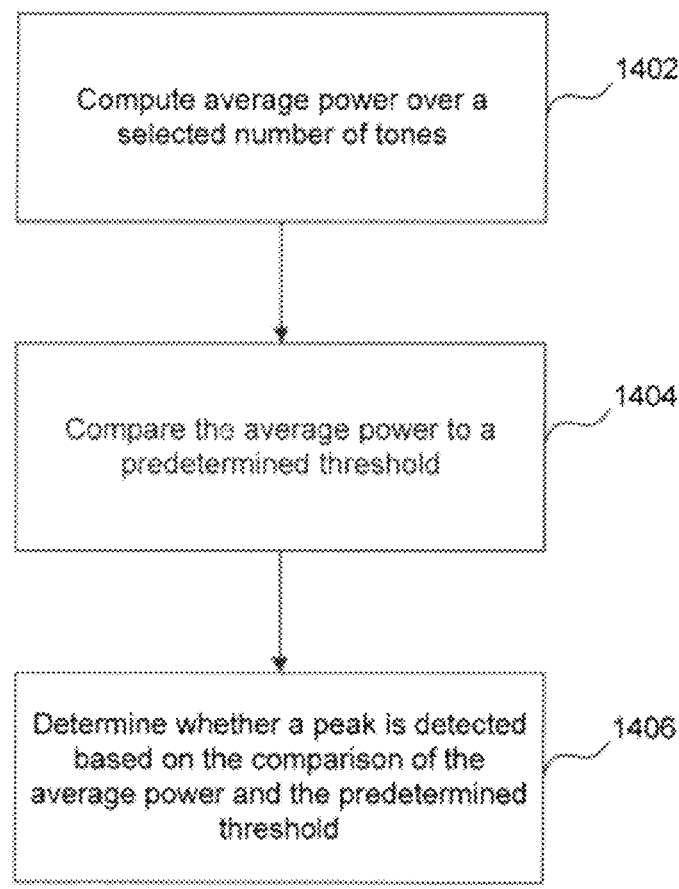

FIG. 14 illustrates a process flowchart of a method of peak detection according to an embodiment of the present invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

In multi-carrier modulation systems (e.g., OFDM, OFDMA, S-CDMA, etc.) or systems using a single-carrier channel or a multiplex of single-carrier channels, high peak to average power ratio (PAPR) events (peaking events) occur when sub-carriers combine constructively. A peaking event may cause a transmitted waveform to violate limits on transmit power as well as on in-band and out-of-band interference. In addition, because the peaking event is a short burst in the time domain, the event causes wideband noise in the frequency domain, potentially corrupting transmitted information over the entire frequency spectrum.

Figure 1:
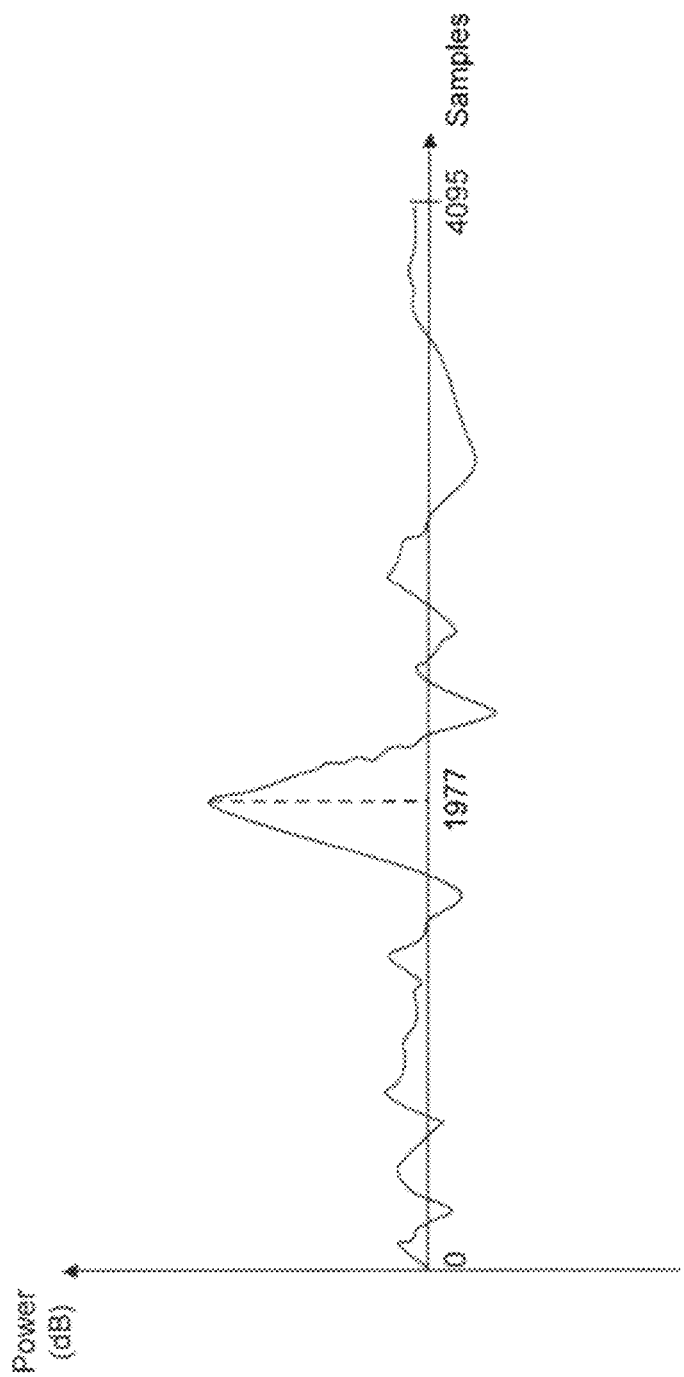
FIG. 1 illustrates an example peaking event in a multi-carrier modulated signal.

FIG. 1 illustrates an example peaking event in a multi-carrier modulated signal 100. For the purpose of illustration only, signal 100 is assumed to represent a single OFDM symbol, comprising multiple simultaneous complex symbols, including possibly pilot symbols. Signal 100 may be generated, for example, using an Inverse Fast Fourier Transform (IFFT) module. The IFFT module takes N (e.g., 4096) complex symbols (e.g., QPSK modulated, QAM modulated, etc.) as inputs (where N is the number of sub-carriers in the system) and outputs a summation of N sinusoids, each sinusoid generated by modulating one of the N sub-carriers with a respective one of the N complex symbols. A complex symbol may have value 0, for example, such as for guard band tones.

The N modulated sub-carriers combine constructively at times, causing peaking events. In the time domain, peaking events appear as short time (few samples time long) power bursts in the IFFT output signal, as shown for example in FIG. 1. If the power burst is strong enough, it could cause clipping or saturation in digital/analog components of the transmitter/receiver or compression in the analog components, resulting in nonlinear distortion in the device. Further because the power burst is of a short time duration, it results in wideband energy in the frequency domain, which degrades the SNR levels of all the sub-carriers. Such wideband energy, even after filtering to attenuate out-of-band energy, may present unacceptably high out-of-band/spurious emissions. As a result, conventionally, the average power of transmitters is reduced in order to meet out-of-band/spurious emission requirements (e.g., spectral mask, ACLR, etc.), in the presence of peaking events.

Embodiments, as further described below, provide techniques for high PAPR event mitigation in high speed data networks, such as cable networks, for example, and may also be applied to other types of networks, including, but not limited to wired, wireless, microwave, WiFi, satellite, telecommunications, cellular, LAN, WAN, MAN, terrestrial, TVWS (television white space), and broadcast networks, to name just a few additional example applications.

For the purpose of illustration only, embodiments will be described with reference to a system employing multi-carrier modulation. However, as would be understood by a person of skill in the art based on the teachings herein, embodiments may also equally be used in other systems, including but not limited to, multiple channel single-carrier modulation systems and spreading systems, and single channel single-carrier modulation systems as applied to a sequence of symbols.

According to embodiments, the techniques operate by predicting or detecting the occurrence of a peaking event at the transmitter, and then mitigating potential effects of the peaking event at the transmitter and/or at the receiver. In one embodiment, the constellation symbol mapping (used by the symbol mapper to map data symbols to complex symbols) is modified to an alternate mapping (of perhaps a multiplicity of alternate mappings) for one or more of the symbols present during, or related to, a peaking event. With the selected alternate mapping, the peaking is reduced compared to the peaking associated with the original mapping for the particular data symbols. By mitigating peaking with one or more alternate constellation mappings the peak mitigation does not excite any distortion or out-of-band energy or spurious emissions. The teachings herein are not limited to complex constellation symbols; the techniques may operate on real-valued constellation symbols (e.g., Pulse Amplitude Modulation), with a constraint, in an embodiment, that phase adjustments as described below be limited to 0 degrees and 180 degrees, but all other aspects of the teachings apply without limitation. Henceforth constellation symbols will be referenced as complex, understanding that real-valued symbols are a subset of complex symbols in these teachings, with imaginary component of zero.

Figure 2A:
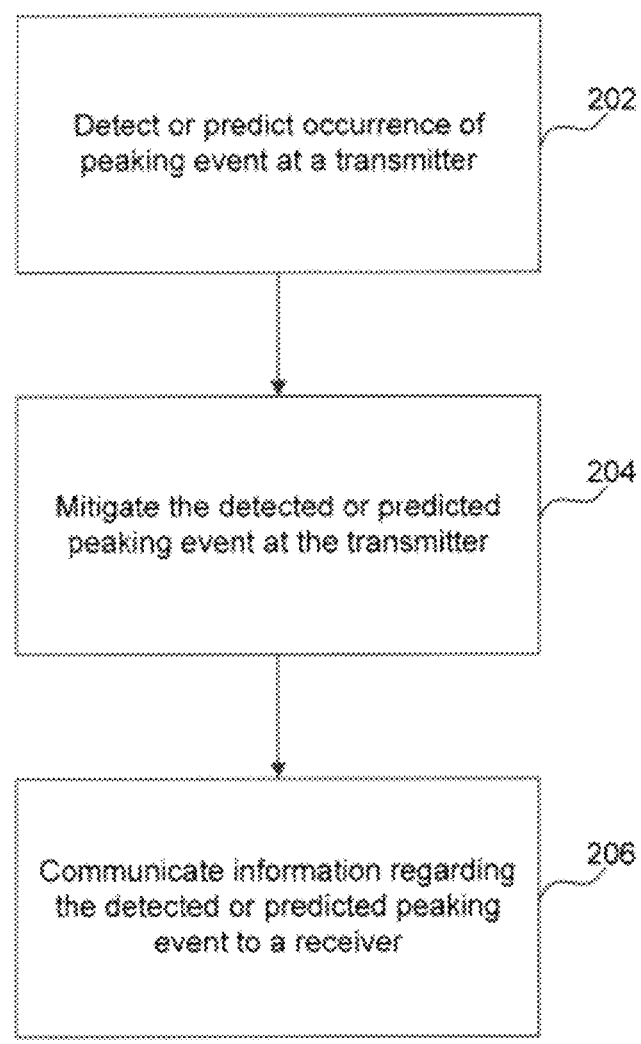
FIG. 2A is a process flowchart of a method of mitigating a high peak to average power ratio (PAPR) event according to an embodiment of the present invention.

FIG. 2A is a process flowchart 200A of a method of mitigating a high peak to average power ratio (PAPR) event according to an embodiment of the present invention. Process 200A is performed in a cable modem, for example. As shown in FIG. 2, process 200 includes steps 202, 204, and optionally a step 206.

Step 202 includes detecting or predicting the occurrence of a peaking event at a transmitter. In embodiments, the transmitter includes a peaking event detector module or a peaking event predictor module that performs step 202. Subsequently, step 204 includes mitigating the detected or predicted peaking event at the transmitter by adjusting the constellation symbol mapping. Optionally, process 200 further includes, in step 206, communicating information regarding the detected or predicted peaking event or the adjusted constellation symbol mapping to a receiver.

Mitigation at the transmitter can be performed using various techniques according to embodiments as further described below. Process 200 is performed entirely at the transmitter side. The receiver may or may not have to perform steps for effective mitigation of the peaking event.

Figure 2B:
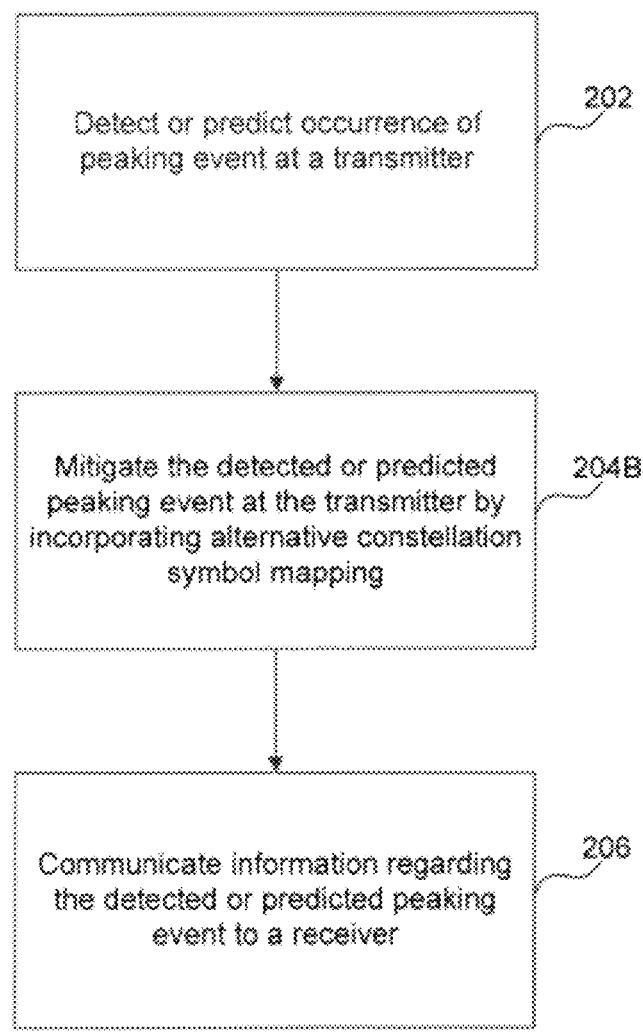
FIG. 2B is a process flowchart of a method of mitigating a high peak to average power ratio (PAPR) event according to an embodiment of the present invention.

FIG. 2B is a process flowchart 200B of another method of mitigating a high PAPR event according to an embodiment of the present invention. Process 200B is similar to process 200A described above, and includes steps 202, 204B, and optionally step 206. Steps 202 and 206 are as described above. Step 204B includes mitigating the detected or predicted peaking event at the transmitter by incorporating alternative constellation symbol mapping. Thus, step 204B includes any use of an alternative constellation symbol mapping to mitigate the detected or predicted peaking event. The alternative constellation symbol mapping can be applied to one or more of the N complex symbols, from which the N modulated sub-carriers or N successive symbols in a single carrier system are generated.

In embodiments, in accordance with process 200B, step 204B includes adjusting the phases of one or more of the N complex symbols so that the N modulated sub-carriers no longer combine constructively (or as constructively as they had prior to the adjustment) at the peaking instant. According to embodiments, this phase adjustment can be done proactively (i.e., before a peaking event occurs based on a predicted occurrence of the peaking event) or reactively (i.e., after a peaking event occurs, the IFFT output is re-generated with the phases adjusted).

Figure 2C:
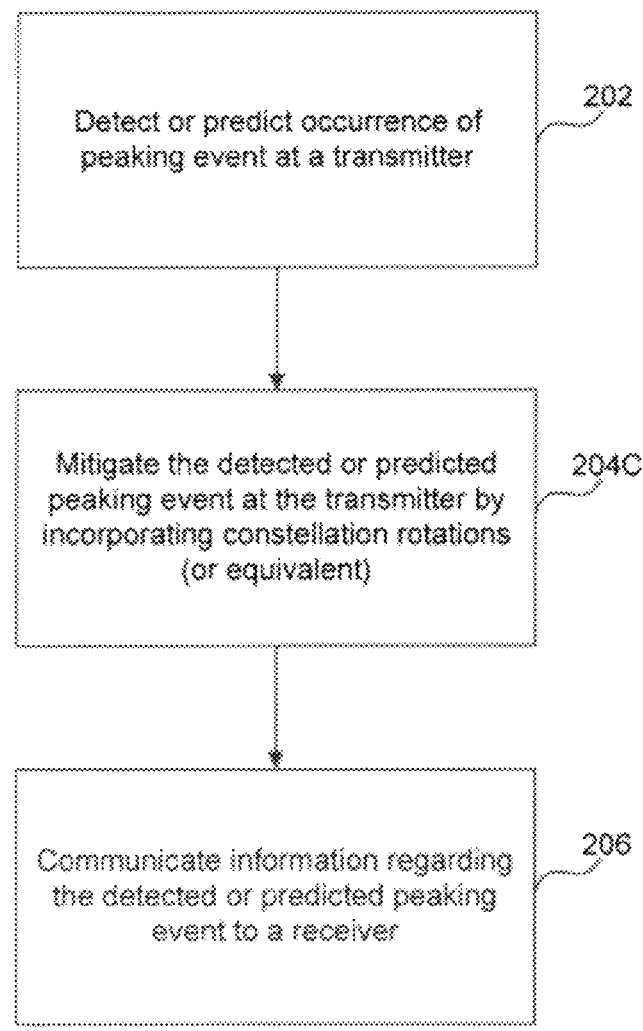
FIG. 2C is a process flowchart of a method of mitigating a high peak to average power ratio (PAPR) event according to an embodiment of the present invention.

FIG. 2C is a process flowchart 200C of another method of mitigating a high PAPR event according to an embodiment of the present invention. Process 200C is similar to process 200A described above, and includes steps 202, 204C, and optionally step 206. Steps 202 and 206 are as described above. Step 204C includes mitigating the detected or predicted peaking event at the transmitter by incorporating constellation rotations (or equivalent). Constellation rotation may be applied to one or more of the N complex symbols, as further described with respect to FIG. 3 below.

Figure 2D:
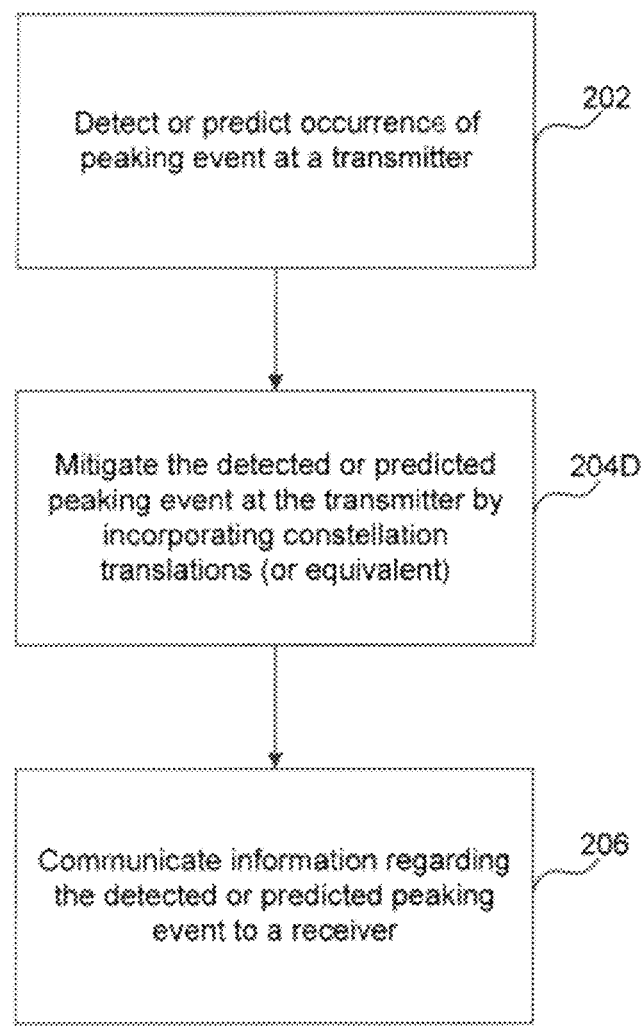
FIG. 2D is a process flowchart of a method of mitigating a high peak to average power ratio (PAPR) event according to an embodiment of the present invention.

FIG. 2D is a process flowchart 200D of another embodiment of mitigating a high PAPR event according, to an embodiment of the present invention. Process 200D is similar to process 200A described above, and includes steps 202, 204D, and optionally step 206. Steps 202 and 206 are as described above. Step 204D includes mitigating the detected or predicted peaking event at the transmitter by incorporating constellation translations (or equivalent). Constellation translation can be applied to one or more of the N symbols, as further described with respect to FIG. 8 below.

In embodiments, one or more of steps 204, 204B, 204C, and 204D may be performed to mitigate peaking. For example, in addition to adjusting the phases of one or more of the N complex symbols (e.g., by constellation rotation in step 204C), constellation translation may be applied to the same (or different) one or more of the N complex symbols.

As further described below, some details differ regarding whether a translational mapping is applied or a phase adjustment is applied to effectively alter the data symbol mapping into constellation symbols, to reduce peaking, but many of the principles and necessary and beneficial ancillary techniques are similar for each.

As would be understood by a person of skill in the art, applying alternative constellation mapping, constellation rotation, and/or constellation translation, without other action, introduces one or more bit errors in the signal recovered at the receiver. However, introducing one or a few bit errors may be a better outcome than a peaking event that degrades a multiplicity of symbols, for example, or causes unacceptably high spurious emissions. In addition, the introduced one or more bit errors may be reduced and/or mitigated according to embodiments, as described below.

In an embodiment, the N complex symbols are generated using a differential coding and rotationally-invariant mapping scheme. As such, two or more of the most significant bits (MSBs) of each symbol are differentially coded. The symbols are then mapped into a rotationally-invariant constellation.

Figure 3:
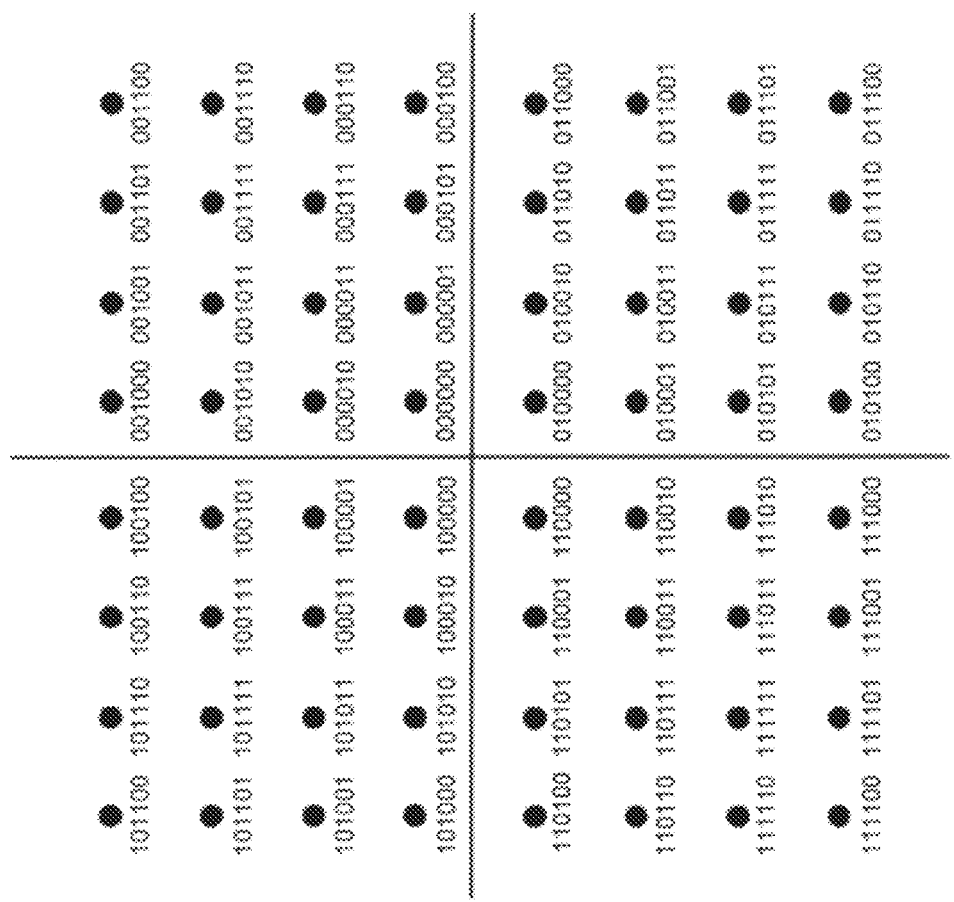
FIG. 3 is an example rotation-invariant modulation encoding scheme.

FIG. 3 is an example 64-QAM rotationally-invariant modulation encoding scheme. In this example, the two MSBs of each symbol are differentially coded. An example, without limitation, of a rotationally-invariant constellation mapping with differentially encoded MSBs is found in the ITU-T J.83-2007 Annex C standard (which is incorporated herein by reference in its entirety). The bits other than the two MSBs are Gray mapped within each quadrant. Bits $b_3$ and $b_1$ (from left to right, the bits are $I_k$, $Q_k$, $b_3$, $b_2$, $b_1$, $b_0$) are Gray mapped up the Q-axis in the upper right hand quadrant of the 64-QAM constellation, for example, and bits $b_2$ and $b_0$ are Gray mapped across the I-axis in the upper right hand quadrant of the 64-QAM constellation.

Continuing the example of FIG. 3, the symbols then are mapped into a rotationally-invariant 64-QAM constellation. As such, a 90°, 180° or 270° rotation of the constellation affects only the MSBs of each symbol at the receiver (prior to differential decoding), leaving the least significant bits (LSBs) unchanged. For example, referring to symbol "101110" in FIG. 3, a clock-wise 90° rotation of the constellation affects only the MSB of the symbol, changing it into symbol "001110" as seen at the receiver after the rotation. Note that the rotation of symbols at the transmitter may occur after the mapping into a constellation point (a phase and amplitude), or may occur on the MSBs themselves prior to the constellation mapping. The approaches are effectively equivalent and preferred choice depends on other details of the modulator implementation.

A multiplicity of rotationally-invariant differentially encoded symbol mapping schemes exist. Some of these schemes do not rely on MSBs for the differentially encoded bits. Such schemes equally may be applied with the embodiments described here. In other words, it is not necessary that the differentially encoded bits involved in the rotationally-invariant mapping be the MSBs. For example, the ITU-T J.83-2007 Annex B standard (which is incorporated herein by reference in its entirety) describes such a rotationally-invariant coding scheme that does not use the MSBs as the differentially encoded bits, and the techniques within apply to this modulation equally well.

ITU-T J.83 Annex B error control coding incorporates a set-partitioned modulation coding, with one LSB for each I/Q "rail" comprising "coded" bits of the modulation, and the remaining MSBs of each "rail" effectively assigned by binary counting in the upper right-hand quadrant ($C^5$ and $C^2$ "count" up the Q-rail and $C^4$ and $C^1$ "count" across the I-rail in the 64QAM constellation mapping, for example). Then, the "counting" MSBs for each rail, comprising the "uncoded" bits of the set-partitioned modulation, are rotated for the symbol assignments in the other quadrants.

ITU-T J.83 Annex B incorporates both set-partitioned coded modulation and rotationally invariant symbol mapping with differential decoding. Further, ITU-T J.83 Annex B prescribes that the differential encoding be performed prior to the error control coding of the "coded" bits of the modulation, unlike ITU-T J.83 Annex C, which prescribes that differential encoding be performed after all of the error control encoding. Significance of this ordering is discussed below. In addition, ITU-T J.83 Annex B provides for coding protection for the "uncoded" bits of the set partitioned coded modulation with a concatenated outer code (which accommodates both the "coded" and "uncoded" bits of the set-partitioned coded modulation). Detailed description of set-partitioned coded modulation can be found in U.S. Patent Application Publication No. 2009/0129484, entitled "Low Density Parity Check (LDPC) Encoded Higher Order Modulation," which is incorporated herein by reference in its entirety. Differentially encoded rotationally invariant mapping and differential decoding at the receiver may be incorporated with such set-partitioned coded modulation schemes, as described in the above referenced standards and as further described below.

Example constellations that have beneficial properties for use with embodiments of the present invention are provided in FIGS. 11A-C and 12A-C. These properties are exploited according to embodiments to facilitate peak mitigation at the transmitter and processing of peak mitigated signals at the receiver.

FIG. 11A illustrates a portion of the ITU-T J.83 Annex B 64-QAM constellation. Specifically, FIG. 11A shows the I and Q rail MSBs moving along the Q-axis in the upper right hand quadrant of the constellation. As can be seen from FIG. 11A, the I and Q rail MSBs follow a count mapping scheme, whereby moving from the bottom to the top the bit values count up from '00' to '01' to '10' and finally to '11.' In addition, this constellation is rotationally-invariant.

FIG. 11B illustrates a portion of the ITU-T J.83 Annex B 256-QAM constellation. Specifically, FIG. 11B shows the Q rail MSBs moving along the Q-axis in the upper right hand quadrant of the constellation. As can be seen from FIG. 11B, the Q rail bits follow a counting mapping scheme, whereby the bit values count up from '000' to '111' moving from the bottom to the top. In addition, this constellation is rotationally-invariant.

FIG. 11C illustrates a portion of a non-rotationally invariant 64-QAM constellation with count mapped Q rail bits along the entire Q-axis.

FIG. 12A illustrates a portion of the ITU-T J.83 Annex C 64-QAM constellation. Specifically, FIG. 12A shows the $b_3$ and the $b_1$ bits (bits are from left to right $I_k$, $Q_k$, $b_3$, $b_2$, $b_1$, $b_0$) moving along the Q-axis in the upper right hand quadrant. As can be seen from FIG. 12A, the bit values follow a Gray mapping scheme, whereby only one bit changes from one value to the next. In addition, this constellation is rotationally invariant.

FIG. 12B illustrates a portion of the ITU-T J.83 Annex C 256-QAM constellation. Specifically, FIG. 12B shows the $b_5$, $b_3$, and $b_1$ bits (bits are from left to right $I_k$, $Q_k$, $b_5$, $b_4$, $b_3$, $b_2$, $b_1$, $b_0$) moving along the Q-axis in the upper right hand quadrant of the constellation. As can be seen from FIG. 12B, the bit values follow a Gray mapping scheme, whereby only one bit changes from one value to the next. In addition, this constellation is rotationally invariant.

FIG. 12C illustrates a portion of a non-rotationally invariant 64-QAM constellation with Gray mapped Q rail bits along the entire Q-axis.

In embodiments, rotational and/or translational mapping adjustment to mitigate peaking may be incorporated with all of the above modulation schemes and others, which may or may not include set-partitioned coded modulation. For example and without limitation, rotational and/or translational mapping adjustment can be used with (1) set-partitioned coded modulation with "uncoded" bits that are Gray mapped or "count" mapped (without rotational invariance) (for example, this may be the constellations described in FIGS. 11C and 12C above); (2) rotationally invariant constellations combined with set-partitioned coded modulation, with "uncoded" bits "count" mapped in the upper right-hand quadrant (for example, this may be the constellations described in FIGS. 11A and 11B above); (3) rotationally invariant constellations using differentially encoded MSBs and Gray mapping or "count" mapping in the upper right-hand quadrant (for example, this may be the constellations described in FIGS. 12A and 12B above); or (4) traditional (without set-partitioned coded modulation) Gray mapped or "count" mapped constellations (without rotational invariance).

Figure 13A:
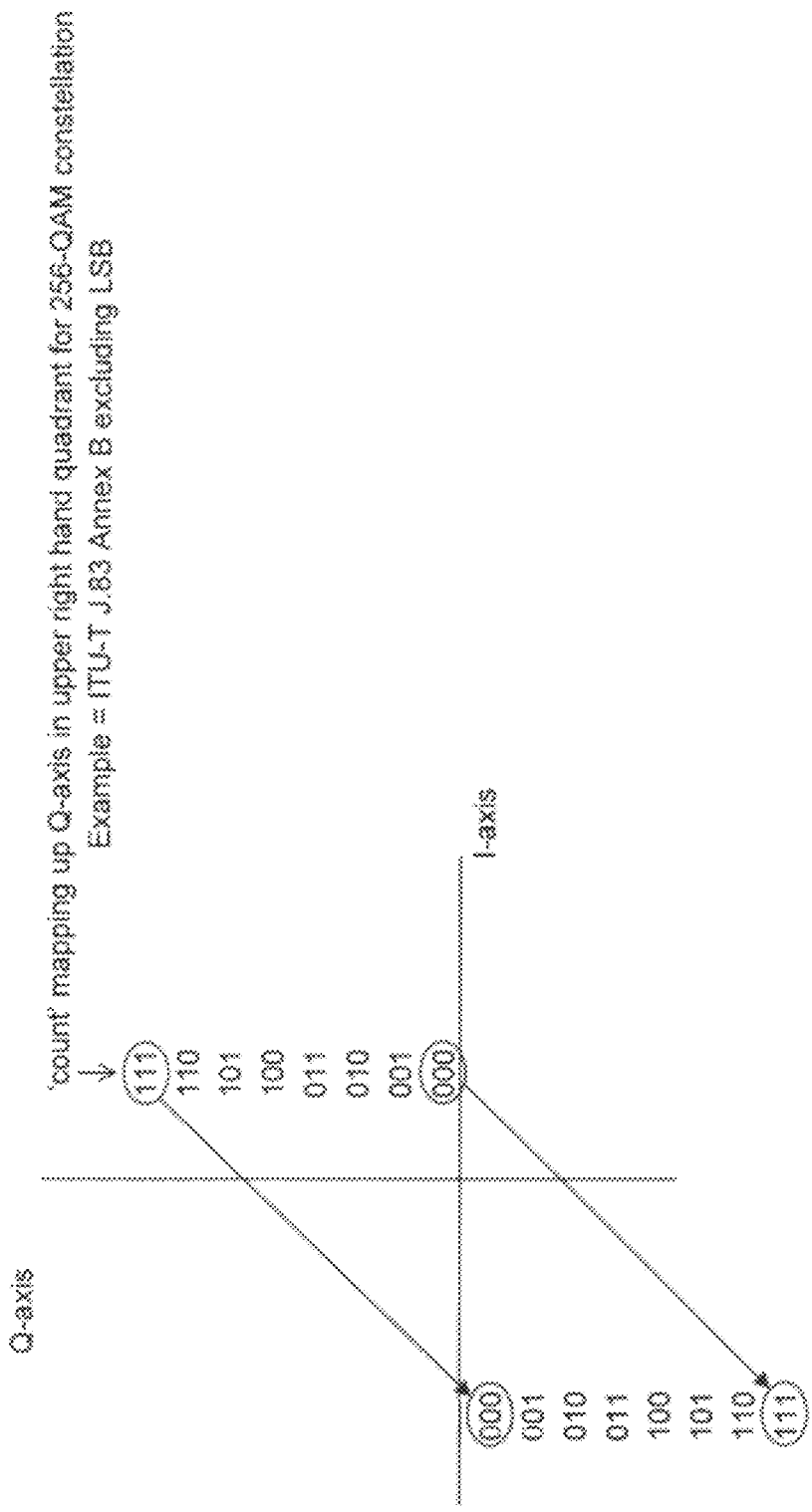
Figure 13B:
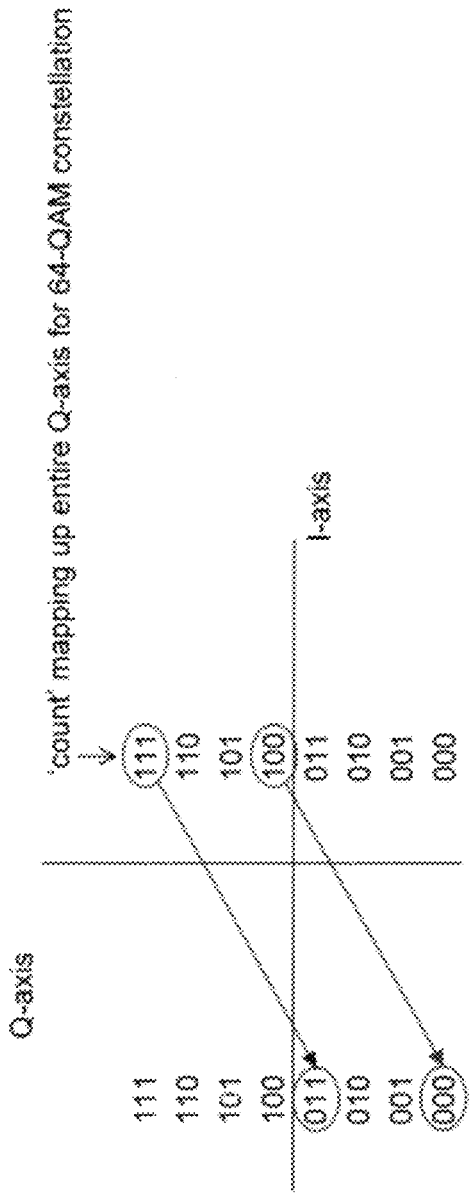
Figure 13C:
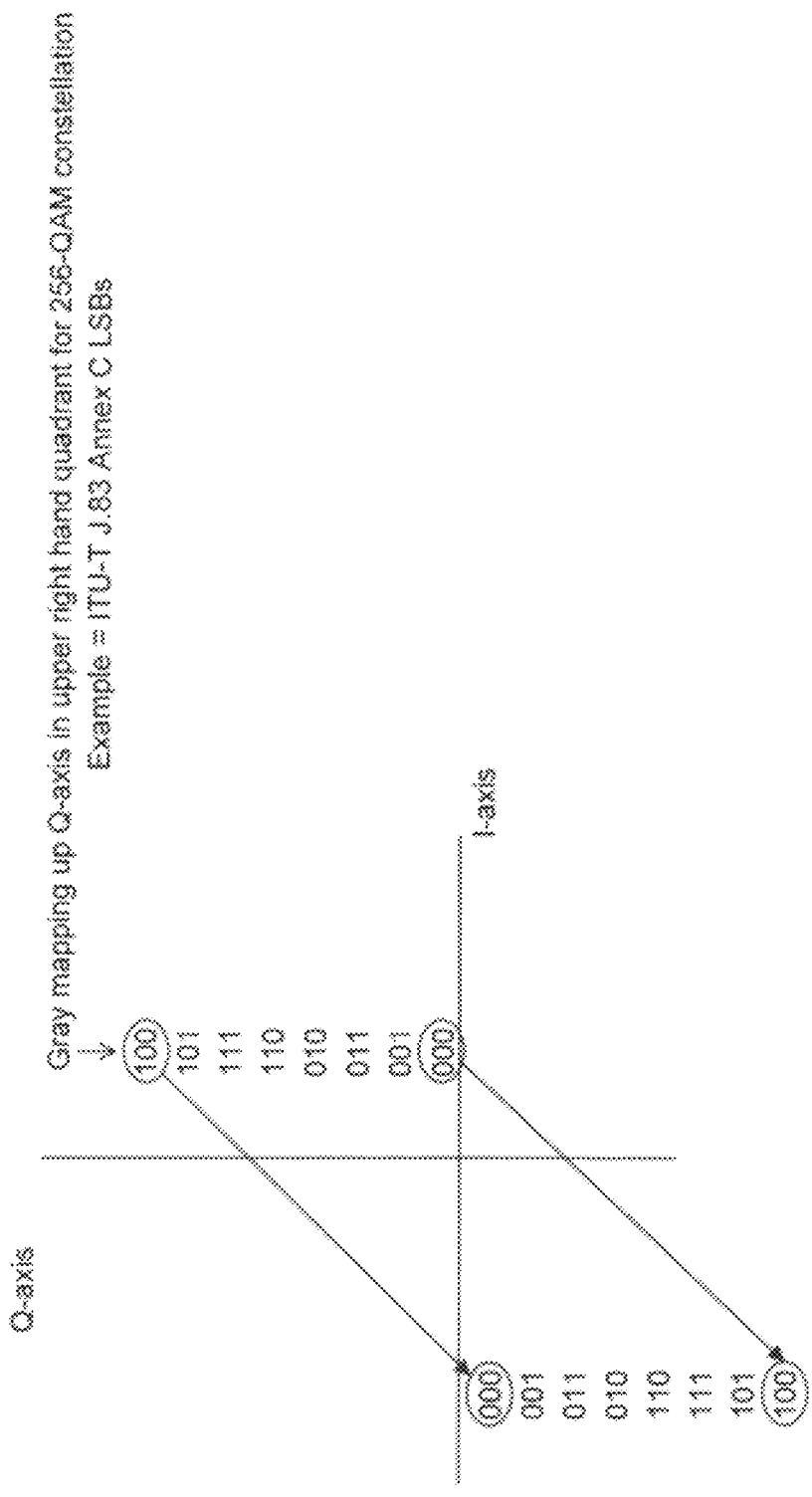
Figure 13D:
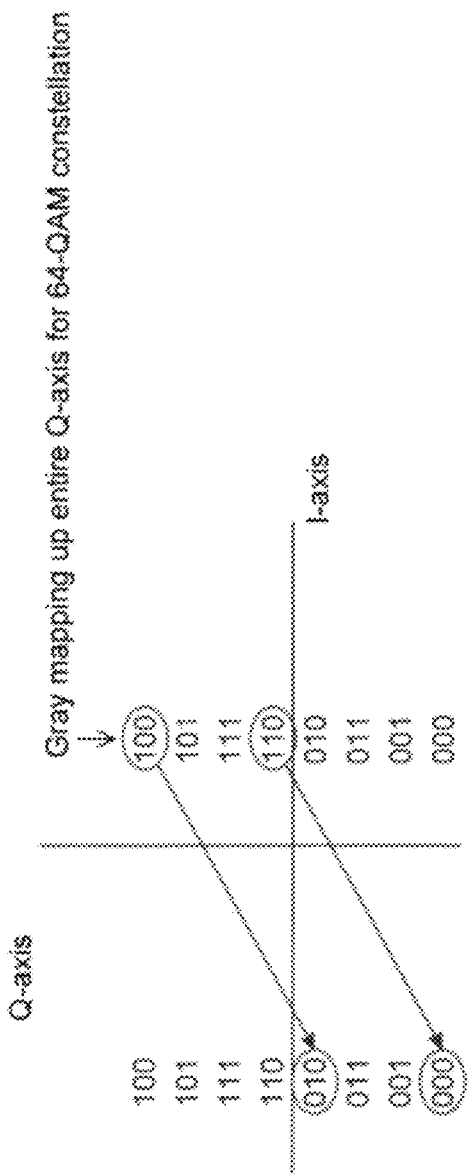

FIGS. 13A-D illustrate applications of embodiments of the present invention. Specifically, FIG. 13A illustrates the application of translational mapping in the case of the ITU-T J.83 Annex B 256-QAM constellation, described above in FIG. 11B. As shown in FIG. 13A, translational mapping simply inverts each bit of the Q rail counting bits. The differentially encoded LSB of each rail is separate from the counting bits for the rail, and these bits are not changed by the translation. FIG. 13B illustrates the application of translational mapping to the constellation described in FIG. 11C above. As shown in FIG. 13B, translational mapping inverts only the MSB of the counting bits, but leaves the LSBs of the counting bits unchanged. FIG. 13C illustrates the application of translational mapping to the ITU-T J.83 Annex C 256-QAM constellation, described above in FIG. 12B. As shown in FIG. 13C, translational mapping results in inverting the MSB of the Gray mapped bits but leaves the LSBs unchanged. The differentially encoded MSB of each rail is separate from the Gray mapped bits for the rail, and these bits are inverted by the translation. FIG. 13D illustrates the application of translational mapping to the constellation described in FIG. 12C above. As shown in FIG. 13D, translational mapping resulting in inverting the two MSBs of the Gray mapped bits but leaves the LSB unchanged.

Thus, in each of the above applications, translational mapping can be readily implemented at the transmitter with one or more bit inversions as discussed above. Similarly, at the receiver, once that a translational mapping has been detected, the original bits can be retrieved with simple processing.

ITU_T J.83 Annex C is an example of rotational invariance, Gray mapping in the upper right hand quadrant, and MSBs used for differential encoding; ITU-T J.83 Annex B is an example of set-partitioned coded modulation, rotational invariance, and "count" mapping in the upper right hand quadrant. When using rotational invariance with set-partitioned coded modulation, the "uncoded" bits may be assigned as "counting" bits in a quadrant; in such a case, the assignment of the same MSBs to a given region of the constellation is not applied, as it is in conventional set-partitioned coded modulation without rotational invariance, but the constellation points are still effectively partitioned into sets characterized by having the same "coded" bits. This symbol mapping approach is taken by ITU-T J.83 Annex B.

Returning to the example of FIG. 3, after using a rotationally-invariant symbol mapping scheme as described above, the phases of one or more of the N complex symbols can be adjusted with only a few bit errors introduced at the receiver according to embodiments. For example, in an embodiment, phase shifts (e.g., 90°, 180° or 270°) are made to one or more of the N complex symbols. As an illustration, without limitation, the symbols are ordered prior to differential encoding, in a fashion known (or determinable) for both the transmitter and receiver, although the ordering for differential encoding may not correspond to the ordering of the symbols in the ultimately modulated waveform in the frequency domain (e.g., for OFDM or other frequency multiplex), code domain (e.g., for S-CDMA), and/or time domain (single carrier or multiplex of single carriers). In other words, scrambling of the symbol ordering or sequencing may occur between the differential encoding and the modulation.

As further illustration, without limitation, a 90 degree phase shift may be applied to a consecutive sequence of symbols immediately following differential encoding and constellation mapping, prior to scrambling into the final modulation waveform, and where the set of such phase shifted symbols is a subset (e.g., half) of a larger plurality of symbols, half of which are not phase adjusted in this example. The positioning of the phase shifted symbols in either frequency or time may be non-adjacent due to the scrambling, but the receiver and transmitter are in concert regarding the scrambling.

After receiving the signal, demodulating, descrambling, and differentially decoding the rotationally-invariant constellation mapping, the 90 degree rotation applied to half the symbols results in only a single symbol carrying hit errors (neglecting, for this illustration, the effects of interference, noise, and/or distortion), and the one or two errors are relegated to the two bits being differentially decoded in the first symbol for which the peak-mitigating phase shift was imparted. This first symbol of a sequence of phase adjusted symbols (each having the same phase adjustment) is called herein a transitional symbol. With differential encoding immediately preceding the symbol mapping (i.e., no intermediate processing), as in ITU-T J.83 Annex C as an example, the second and following phase shifted symbols have no such errors, owing to the differential decoding and rotationally-invariant mapping. Error control decoding follows the differential decoding in this example, and in many (probably most) cases will correct the introduced bit error or two.

With error control coding performed between differential encoding and symbol mapping, as with the "coded" bits in the set-partitioned coded modulation of ITU-T J.83 Annex B, additional steps may need to be introduced at the receiver to best accommodate a phase quadrant rotation which is otherwise unanticipated and unknown to the receiver. Without these additional steps the receiver may produce a run of symbols with erred bits in association with a transitional symbol, however, eventually the error control decoder operating on the "coded" bits will "flush" the transition and the subsequent differential decoding will provide correct bits again. This performance characteristic may be acceptable for accommodating relatively rare phase quadrant cycle slips in a receiver, but with intentionally introduced phase quadrant adjustments introduced to mitigate peaking, as described in embodiments of the present disclosure, these error runs are undesirable.

Note that the ordering of the differential encoding and error control coding in ITU-T J.83 Annex B could be reversed in other (or future) applications of combined set-partitioned modulation and rotationally invariant modulation, thus eliminating the aforementioned complication with intentionally introduced rotations for mitigating peaking (or for any other purpose).

To mitigate a run of errors associated with a phase quadrant adjustment, in one embodiment, the transmitter may signal the adjustment to the receiver (type of adjustment and transitional symbol), whereupon the receiver can correct for (or even undo or reverse) the adjustment. In an alternative embodiment, the transmitter may only signal some of the adjustment information, such as type of adjustment, without pinpointing precisely the transitional symbol; or may identify the transitional symbol without identifying the type of adjustment; but in any of these cases there is reliance on some receiver discovery mechanisms, unless the errors associated with phase quadrant adjustments are to be tolerated (perhaps subsequent error control coding within the receiver is adequate to tolerate some additional errors, among other plausible reasons). In another embodiment the receiver may wholly rely on receiver discovery mechanisms without any signaling from the transmitter about adjustments.

Figure 9:
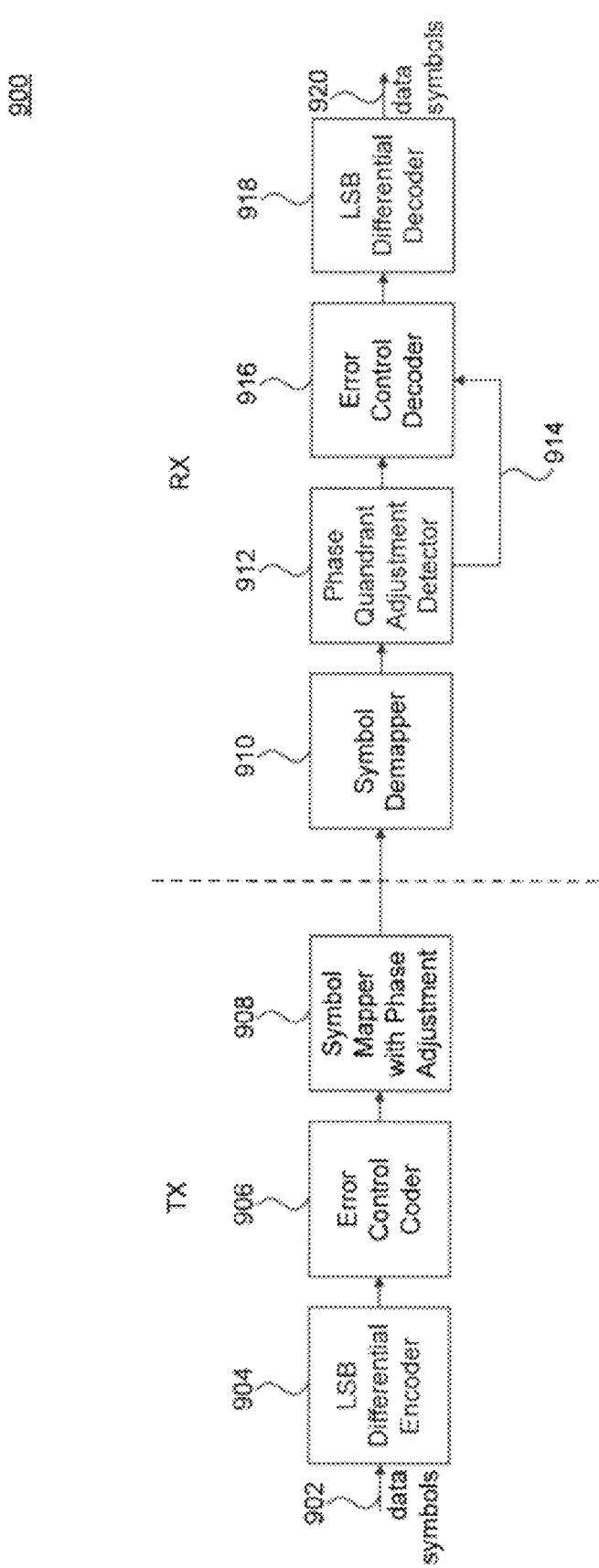
FIG. 9 illustrates example transmitter and receiver processing according to an embodiment of the present invention.

Additional receiver processing to mitigate the run of errors associated with the phase quadrant adjustments is shown according to an example embodiment 900 in FIG. 9. As shown in FIG. 9, at the transmitter, a sequence of data symbols 902 are each differentially encoded using LSB differential encoder 904. This LSB differential encoding gives the symbols the rotationally-invariant characteristic with respect to certain phase rotations (e.g., 90 degrees). The differential encoded symbols are then processed by error control coder 906, which applies error control coding to each symbol, and then by symbol mapper 908. Symbol mapper 908 according to embodiments may apply phase adjustment and/or translational mapping to at least one symbol (e.g., rotational or translational adjustments) of the sequence to mitigate peaking events.

At the receiver, a received sequence of symbols are demapped by symbol demapper 910 to generate demodulated "coded" symbols (containing initial estimates or associated initial soft decisions). The coded symbols are then applied to a phase quadrant adjustment detector 912, which determines whether or not a phase adjustment and/or rotational/translational adjustment has been applied to a symbol of the sequence by symbol mapper 908 and the amount of phase adjustment (e.g., 90 degrees, 180 degrees, etc.) and/or rotational/translational adjustment applied, if any. This circuit may also detect if an unintentional phase slip has occurred in the receiver ahead of the symbol demapper. This information regarding any "transitional" symbol(s) (i.e., location and amount of phase/translational/rotational adjustment) is provided using signal 914 to error control decoder 916. With knowledge of any symbol phase/translational/rotational adjustment applied after error control coding (by error control coder 906), error control decoder 916 performs error control decoding correctly. Finally, the error control decoded symbols are LSB differential decoded by LSB differential decoder 918 to provide data symbols 920.

Figure 10:
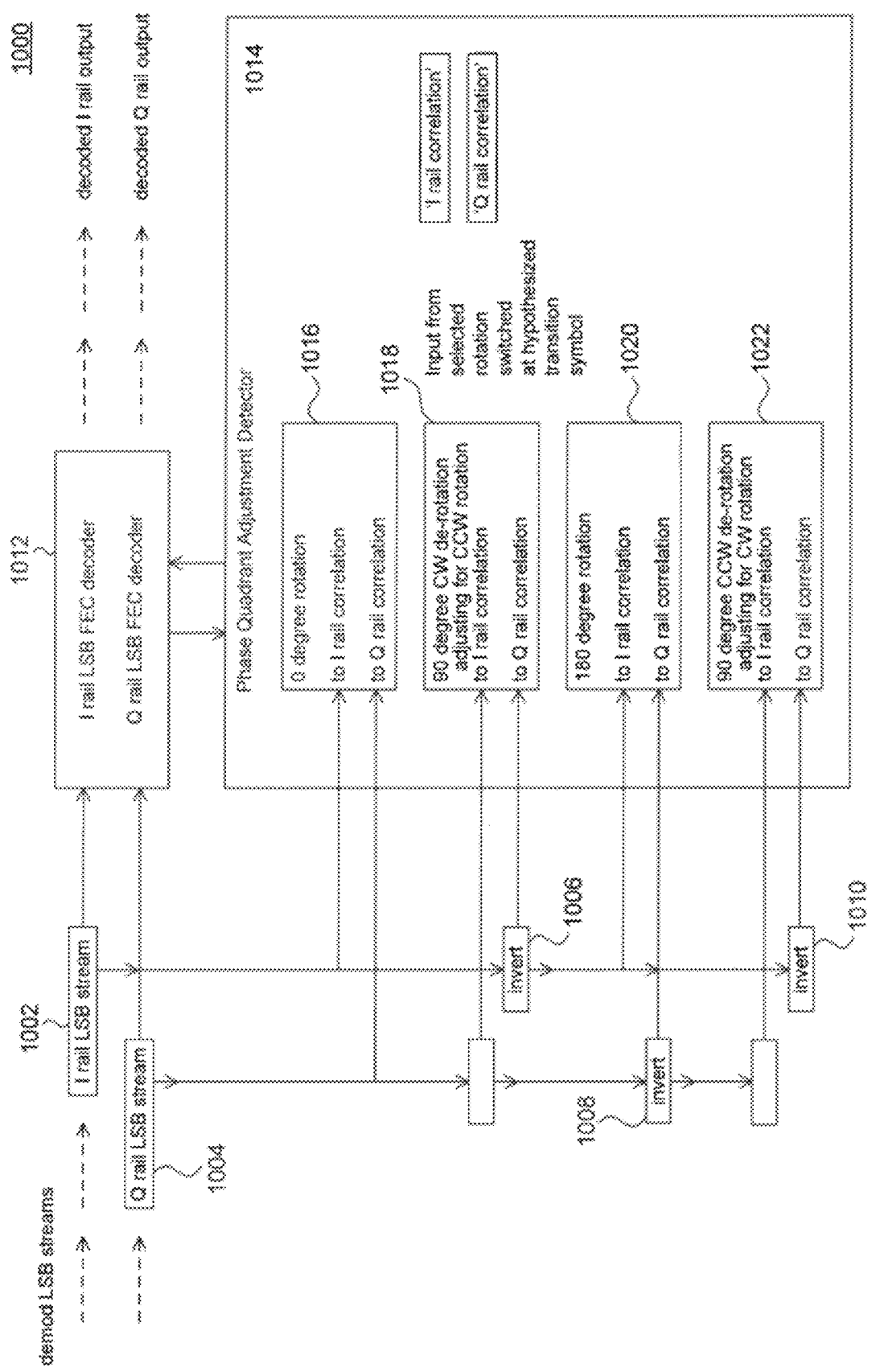
FIG. 10 illustrates example phase quadrant adjustment detection according to an embodiment of the present invention.

FIG. 10 illustrates example phase quadrant adjustment detection 1000 according to an embodiment of the present invention. Example 1000 is provided for a constellation mapping based on the ITU-T J.83 Annex B.

As shown in FIG. 10, demodulated LSB streams are received and divided into an I rail LSB stream 1002 and a Q rail LSB stream. LSB streams 1002 and 1004 are fed in a FEC decoder 1012 to generate decoded I and Q rail outputs.

Phase quadrant adjustment detector 1014 operates by testing 4 different hypotheses in respective processors 1016, 1018, 1020, and 1022 for a given symbol (typically the symbol selected for testing is a potential transitional symbol, i.e., one at which phase adjustment may have begun at the transmitter) and subsequent symbols. Processor 1016 tests the hypothesis that the symbol is not a transitional symbol. Processor 1018 tests the hypothesis that the symbol has undergone a 90 degrees counter-clockwise rotation. Processor 1020 tests the hypothesis that the symbol has undergone a 180 degree rotation. Processor 1022 tests the hypothesis that the symbol has undergone a 90 degrees clockwise rotation.

In an embodiment, check sums (and/or state probabilities) associated with the error control encoding of the "coded" bits (in this example, LSBs) are tested, with the "coded" bits at the target symbol (and subsequent symbols) being modified in a fashion to "undo" the impact of a hypothesized phase quadrant adjustment. For example, as shown in FIG. 10, in the case of a hypothesized 90 degrees counter-clockwise rotation (which causes the Q rail to be inverted and the I and Q rails to be swapped), the I rail is inverted and the I and Q rails are swapped by feeding the I rail to the Q rail processing and the Q rail to the I rail processing in processor 1018.

The check sums associated with the three incorrect hypotheses will typically not "ring up" as successfully as the check sums associated with the sequence of "coded" bits modified in association with the correct hypothesis (e.g., the correct hypothesis will result in a path metric which indicates a high probability of agreement for the received sequence), even in the presence of errors introduced by noise, distortion, etc. Other embodiments incorporate the multiple hypothesis possibilities directly into the error correction decoder 1012.

The portion of symbols imparted with phase adjustments at the transmitter (which may be any portion of a sequence of symbols), is dependent upon the amount of peaking mitigation which is desired and the complexity of transmitter and/or receiver implementations, and ultimately upon the particular data values (particular constellation symbols) neighboring (in time) any given peaking instance. By allowing more subsets or subgroups of symbols to be phase adjusted (e.g., three subgroups of one fourth the total number of symbols in a frame or block each), and allowing different quadrature shifts for each subgroup, more peaking mitigation is provided, but more complexity is introduced. Determining a good or best choice for phase adjustments involves more complexity when more flexibility or options are available at the transmitter, for example. With more phase adjustment choices available in the waveform, there are more transitional symbols, and thus more errors may be introduced at the receiver (even after the differential decoding), making the mitigation of such errors at the receiver more problematic in general.

In one embodiment, the symbols in a frame are rotationally invariant mapped according to a sequence that corresponds to the OFDM carrier tone numbering in some fashion. For example, in an OFDM symbol with 256 carrier tones of which 240 tones are used (divided between data and pilot information) and 16 tones are unused (e.g., 8 upper tones and 8 lower tones are guard bands), the 240 used tones can be numbered from 1 to 240. For example, the 240 tones can be numbered sequentially according to frequency, with the lowest frequency tone numbered as 1 and the highest frequency tone numbered as 240. In one embodiment, if a peak above a predetermined threshold is detected, the tones 121 to 240 are phase shifted by 180 degrees and the signal is re-modulated, which in many cases will result in a smaller peak during the frame. By incorporating rotationally invariant symbol mapping the receiver will incur bit errors due to the 180 degree rotation (neglecting for illustration purposes, other noise and distortion events) only in symbol 121, the transitional symbol in this case, the first symbol processed with the rotation. The differential decoding associated with the rotationally invariant mapping will result in correct demodulation for symbol 122 and all the subsequent symbols. Error correction decoding at the receiver can be modified to account for the possibility that symbol 121 in the example may incur bit errors in the differentially encoded bit positions, intentionally introduced as it were, and the ability to correct these errors may be enhanced beyond the capability of a receiver and decoding which did not account for this possibility explicitly.

According to embodiments, peak detection or prediction can be performed using one or more of the following approaches: a) modulating the complex symbols with respective sub-carriers and then applying a brute force threshold test to detect a peak; b) detecting known data patterns associated with peaking (in an embodiment, the constellation is reduced or quantized to a lower number of bits or lower phases before detection processing, but only for the purpose of detection processing, not for subsequent transmission); (c) computing average power over a group or sub-group of tones and comparing it to a predetermined threshold; (d) computing average with other nonlinearity (other assignment of "mass" to constellation point besides squared amplitude), over group or subgroup of tones, e) examining IFFT output for particular locations of peaks (similar to #a).

FIG. 14 is a process flowchart 1400 of a method of peak detection according to an embodiment of the present invention. Process 1400 may be performed at the transmitter. As shown in FIG. 14, process 1400 includes steps 1402, 1404, and 1406.

Process 1400 begins in step 1402, which includes computing an average power over a selected number of tones. The selected number of tones can be any number of tones in a frame, including the entire frame. Subsequently, process 1400 proceeds to step 1404, which includes comparing the average power to a predetermined threshold. The predetermined threshold is determined a priori, in an embodiment, based on average power measurements associated with peaks. The predetermined threshold is proportional to the selected number of tones processed in step 1402. Finally, process 1400 terminates in step 1406, which includes determining whether or not a peak is detected based on the comparison of the average power and the predetermined threshold. In an embodiment, a peak is detected if the average power is determined to just exceed the predetermined threshold. In other embodiments, other determinations can be used.

In embodiments using modulations other than OFDM or OFDMA the same or similar techniques for peaking detection or prediction, and for peaking mitigation, as described for OFDM above, are applicable. For example with multicarrier QAM, each channel with a single-carrier QAM transmission is analogous to a tone in OFDM, and the composite of all such channels or carriers is analogous to the transmission of all the tones in OFDM. For example, phase adjustments on individual QAM channels, or portions of the full set of QAM channels, may be operable just as for phase adjustments on individual tones or portions of the full complement of OFDM tones. As another example, in S-CDMA modulation, in addition to treating each channel as analogous to an OFDM tone throughout, each spreading code or portion of spreading codes may be taken as analogous to an OFDM tone or portion of tones. In S-CDMA modulation, preamble symbols are analogous to OFDM pilot tones and may be used for signaling information as with OFDM pilot tones, as will be discussed below. For single channel single-carrier modulation systems, embodiments may be applied as described herein with respect to successive symbols in a single carrier.

In some embodiments the location (and particular adjustment) of the transitional symbols are indicated to the receiver. In another embodiment, one or more pilot tones are phase adjusted to signal the invocation of the 180 degree rotation within the frame (e.g., of the tones 121 to 240 which are phase shifted by 180 degrees, one or more may be pilot tones themselves). In general, phase shifting or other adjustment of pilot tones may signal to the receiver which of various symbol mapping options is invoked for peak mitigation. It is noted however that embodiments are not limited to always apply symbol mapping adjustments that are the same for both the data tones and some or many of their neighboring pilot tones. However, using the same pilot tone phase adjustments for some or many of the pilot tones which neighbor data tones (which are adjusted to mitigate peaks) is one suitable approach to mitigating even the small number of errors which are incurred with rotationally-invariant symbol mapping.

In another embodiment, rather than explicitly signaling the receiver about the symbol mapping modification used to mitigate peaking in a given frame or sequence of symbols (e.g., via pilot tone adjustments), the receiver has a priori knowledge of the tones which may be used for phase rotations to mitigate peaks (being typically a small portion of the total number of tones in a frame or sequence). The receiver thus makes demodulation and decoding decisions that account for the possibility that these tones may have phase rotations.

In segmenting the tones for symbol mapping adjustments to mitigate peaking, consecutive grouping of tones is not required. For example, the 240 tones can be numbered sequentially according to frequency, assigning the tone numbering from low frequency to high frequency as (1, 121, 2, 122, 3, ..., 119, 239, 120, 240) to the 240 non-zero tones. This has the result that when the 180 degree phase shift is applied to tones 121 to 240, every alternate tone in the spectrum is phase shifted. Yet since the ordering of the differential processing for rotational invariance is understood at both the transmitter and receiver, there is still only one symbol which produces an error (and only in the differentially encoded bits) upon differential decoding, prior to error correction decoding, even without passing the applied symbol mapping adjustment to the receiver explicitly. Other numbering schemes (including scrambling which varies from frame-to-frame) may also be used as would be understood by a person of skill in the art based on the teachings herein, and similarly other phase adjustment schemes using quadrature shifting, and other divisions of a frame or sequence of symbols (such as into more than two subgroups sharing the same symbol mapping adjustment) may be applied.

In an embodiment, the numbering scheme is known a priori, or communicated to the receiver so that it knows the tone order according to which the differential decoding of the differentially encoded constellation bits is to be done.

By rotating (by 90 degrees or multiple thereof) all of the carrier tone phases beginning from a particular data carrier tone (roughly in the middle of the numbering scheme) on to the end of the carrier tones of the frame, only one carrier tone will have its differentially encoded bits impacted at the receiver, after differential decoding, owing to the rotation (assuming for this explanation, no symbol errors due to noise). The carrier tone that has its differentially encoded bits affected is the tone beginning with which phase rotation is performed (e.g., if phase rotation begins at tone number 121, only tone number 121 will have its differentially decoded bits affected). In another embodiment, multiple carrier tones (e.g., possibly more than one per frame) may start a new phase rotation for subsequent carrier tones, which allows various degrees of freedom (e.g., different phase adjustments, in multiples of 90 degrees, and different carrier tones to begin the phase adjustment) for reducing a detected or predicted peaking event. Incorporating more than one phase adjustment in counting sequentially across the enumerated data carriers provides more opportunities for finding favorable phase adjustments with reduced peaking, while adding additional locations or symbols resulting in differentially encoded bit errors after differential decoding (in addition to symbol errors which may occur due to noise).

In an embodiment, the locations where phase adjustments may be applied (within the enumerated carriers) is limited and determined a priori, which allows improved receiver error correction performance due to this a priori knowledge.

Additionally, for high density constellations with pilot tones present, phase adjustment information may be incorporated within the pilot tones, using BPSK or QPSK for example, in one or more of the pilot tones. In many applications where high density constellations are feasible, maintaining every pilot tone un-modulated is not necessary. In one embodiment, pilot tones are included in the enumeration of the carriers and incur the same quadrant phase shifts as the data carriers. This provides additional information to the receiver for making data decisions, taking advantage of often-unused channel capacity associated with pilot tones. Using the pilot tones for carrying information about phase adjustments made to reduce the peaking allows the beneficial application of normally untapped available channel capacity. Since (in general) a multiplicity of pilot tones will carry the phase adjustment, there is built-in redundancy enabling channel estimation and data estimation to be more robust than would occur if only a single bit of information signaled a phase adjustment (e.g., multiple pilot tones carrying the same phase adjustment information benefits both the channel estimation and the data estimation compared to only a single pilot tone signaling a phase adjustment).

Rotationally invariant symbol mapping in high density constellations incurs a degradation in error performance in an AWGN (Additive White Gaussian Noise) channel model at a given SNR (typically, the degradation is very small, e.g., 0.2 dB in the example of ITU-T J.83B according to some references). However, this degradation is acceptable in some applications given the substantial benefits of higher average transmit power afforded by the peaking mitigation just described.

In another embodiment, set-partitioned coded modulation (e.g., "Trellis coded modulation" when using a convolutional code, such as in ITU-T J.83 Annex B to encode the "coded bits") is applied for LSBs (Least Significant Bits) of constellation symbols, outer coding is provided for the decoded LSBs together with the MSBs (as in ITU-T J.83 Annex B), or separate error correction coding is applied to the MSBs.

Set-partitioned modulation for LSBs (in general more than one LSB per rail may be incorporated in the set-partitioning), additional (separate or concatenated) error correction for the remaining bits (higher order than the LSBs), rotationally invariant symbol mapping, and peak reduction by introduction of quadrant phase adjustments (as described above), and peak reduction by translational mapping adjustments (as described above and further below) comprise a powerful and synergistic combination for providing efficient communications with multiple high density carriers achieving high average power while limiting out-of-band spurious emissions.

In some embodiments, the receiver is not provided explicit indication of parameters of adjustments to mitigate peaking, and with rotationally invariant symbol mappings and error control coding the number of bit errors introduced by the phase adjustments may be tolerable. The error control coding may be adjusted to include the possibility of phase adjustments beginning at some subset of carrier tones. Therefore, in some embodiments the receiver determines, without explicit signaling information, the parameters of adjustments (phase adjustment values and impacted symbols; symbols with translational adjustments). In other embodiments pilot tones aid the receiver by indicating some or all of the information in a prescribed manner as described above.

In still other embodiments, bits otherwise carrying data contain the adjustment parameters for a particular frame (or set of symbols, henceforth "frame"), where different frame sizes and frame types may exist even in a particular stream or burst transmission. These bits conveying adjustment parameters for a particular frame are "signaling bits". By incorporating signaling bits to signal phase adjustments and/or translational mapping adjustments made at the transmitter (to mitigate peaking), the receiver performance is enhanced and complexity reduced, generally. The receiver may use the signaling bits to improve the estimate of the parameters of the adjustments in the symbols which may contain adjustments.

In some embodiments where signaling bits are inserted in the transmission, rotationally invariant differentially encoded symbol mappings are not employed.

In one embodiment, the signaling bits may be inserted into the transmitted symbols in a frame following the frame to which they apply, which requires receiver buffering of the previous frame, or only partially demodulating and decoding the symbols in the previous frame, until the signaling bits in the subsequent frame are decoded themselves. "Throwing" signaling bits into a "forward" frame eliminates instability incurred by including signaling bits within the frame to which they apply.

Transmission of signaling bits in (essentially) concurrent frames is applied in one embodiment, wherein one or another of the frames is understood at both the transmitter and receiver to contain the signaling information of another particular (known at both transmitter and receiver) frame.

In such embodiments where signaling bits are "thrown forward" (or to a specified concurrent) frame or set of symbols, if a "last" frame is reached (such as in a burst communication), then any combination of the following may be performed: a) signaling bits are incorporated into the same frame or set of symbols to which they apply (in the last frame or set of symbols) as described below (possibly incorporating additional loss of information capacity since signaling bits for two frames or sets of symbols are now accommodated); b) the receiver operates to determine the parameters of the adjustments of the last frame without the a priori information provided by signaling bits or pilot tones (as described above); c) pilot tones convey some information about the adjustment parameters for the last frame (as described above); d) rotationally invariant differentially encoded symbol mapping may be used even if not employed in the previous frames; and e) translational mapping adjustments may be disallowed or restricted more than in previous frames.

In another embodiment, some of the bits which are "uncoded" by the set-partitioned coded modulation, on one or some of the data carriers, are used for communicating either phase adjustments or translational mapping adjustments, or both, to the receiver. These provide another type of "signaling bits". In one embodiment, signaling bits are assigned (within the symbol mapping) to bits which are in typically more reliable positions than the coded set-partitioned bits (prior to the set-partitioned decoding); further robustness can be provided for the signaling bits by adding redundancy or other additional coding in these bits (at the expense of reducing the data capacity). This is in addition to or separate from the set-partitioned coding and in addition or separate from other coding associated with non-signaling data bits.

In an embodiment, the data carriers carrying phase adjustment information, translational mapping adjustment information, and signaling bits (or a combination thereof) in some of their bits are not subject to phase adjustment themselves; since phase adjustments across the data carriers are relative, without loss of generality, at least one data carrier does not beneficially impact peaking with its phase adjustment.

In an embodiment, the bits within a symbol which is carrying phase adjustment information, translational mapping adjustment information, or a combination thereof (e.g., signaling bits) are bits which are invariant in the symbol mapping under the possible mapping adjustments. This characteristic provides that the signaling bits may be recovered without having to determine the mapping adjustments applied to the frame containing them. As an example, the 4 LSBs of the 256-QAM symbol mapping of ITU-T J.83 Annex C are invariant under a quadrant phase adjustment, a translational adjustment, or a combination, as are the 2 LSBs of the ITT 1-T J.83 Annex C 64-QAM symbol mapping.

In an embodiment, the bits within a symbol which is carrying phase adjustment information, translational mapping adjustment information, or a combination thereof (i.e., signaling bits) are bits which are invariant except each is inverted, in the symbol mapping under a mapping adjustment. As an example, the 6 MSBs of the 256-QAM symbol mapping of ITU-T J.83 Annex B are invariant except each is inverted, under a translational adjustment, as are the 4 MSBs of the ITU-T J.83 Annex B 64-QAM symbol mapping.

Bits "uncoded" by the set-partitioned coded modulation may be coded by a separate coding scheme from the set-partitioned coded modulation, and/or by an outer code of a concatenated coding scheme, in general. This coding is often applied to "typical" data bits, as differentiated from "signaling bits"; this coding can vary from frame to frame, in general.

In one embodiment, a multiplicity of bits, either coded or "uncoded" or a mixture of both within the set-partitioned and/or rotationally invariant coding, are assigned as a codeword themselves, called a signaling-bits'-codeword; the signaling-bits'-codeword occupies a subset of bit positions from one or a plurality of symbols. When using "coded" bits within the set-partitioned modulation, or using bits involved in an outer coding scheme or other coding scheme for the "uncoded" bits, in one embodiment, all such bit positions for the bits in the signaling-bits'-codeword correspond to information bit positions (in reference to the set-partitioned coding and other coding applied to "typical" data bits) such that the signaling-bits'-codeword may be decoded without requiring the decoding of the set-partitioned modulation or the coding applied to the "typical" data bits. Bit positions identified as invariant with respect to the various adjustments are especially suitable for carrying the signaling-bits'-codeword. Bit positions identified as invariant with respect to various adjustments except for possible data inversion are especially suitable for carrying the signaling-bits'-codeword when the signaling-bits'-coding is tolerant of data inversion. The signaling-bits'-codeword for transmission to the receiver is selected from the list of possible codewords based upon the particular parameters of a phase adjustment scheme, a translational mapping scheme, or a combination scheme, for a particular frame of data. Such a coding scheme may be no coding at all (just bits identifying each parameter), may be a simple repetition scheme, may be a Hamming code, extended Hamming code, Golay code, extended Golay code, or any other coding scheme. This selected codeword is carrying "signaling bits" to the receiver indicating how a frame (multiplicity of symbols) is to be correctly interpreted in terms of the particular parameters of the adjustment scheme(s) employed to mitigate the peaking for the particular set of symbols in the frame.

In some previous embodiments the signaling bits for a frame were incorporated into a different frame from which they were contained themselves. In one embodiment signaling bits are included in the same frame for which they signal the adjustments. In one such embodiment the signaling bits are assigned LSB or near-LSB positions in the symbols such that each symbol has its amplitude and phase modified by only a small amount depending on the value of the signaling bit(s) within each symbol used to carry signaling bits. This assignment of signaling bits helps reduce the impact of containing signaling bit information in the frame to which it applies.

In one embodiment incorporating any of the techniques of previously described embodiments, signaling bits are confined to symbols which will not be translationally adjusted to mitigate peaking. This characteristic provides that the signaling bits may be recovered without having to determine the translation adjustments applied to the frame containing them.

In one embodiment incorporating any of the techniques of previously described embodiments, signaling bits are confined to symbols which will not be phase adjusted to mitigate peaking. This characteristic provides that the signaling bits may be recovered without having to determine the phase adjustments applied to the frame containing them.

In another embodiment, the combination of set-partitioned coded modulation using "coded" LSBs (in general more than one bit per rail), additional error correction for the remaining bits (higher order than the LSBs), and peak reduction by introduction of quadrant phase adjustments (as described above) also provides a powerful and synergistic combination for providing efficient communications with multiple high density carriers and achieving high average power while limiting out-of-band spurious emissions. Errors on the differentially encoded bits on a multiplicity of carriers may be incurred when one or more phase adjustments are applied to a frame, but by incorporating side information, as described above, the phase adjustments can be reliably estimated at the receiver and the differentially encoded bits corrected prior to further decoding.

In another embodiment, the combination of set-partitioned modulation for LSBs, additional error correction for the remaining bits (higher order than the LSBs), and peak reduction by introduction of quadrant phase adjustments (as described above), but without rotationally invariant symbol mapping, further provides a powerful and synergistic combination for providing efficient communications with multiple high density carriers and achieving high average power while limiting out-of-band spurious emissions. Without using rotationally invariant modulation, errors on a multiplicity of carriers may be incurred when one or more phase adjustments are applied to a frame, but by incorporating side information, as described above, the phase adjustments can be reliably estimated at the receiver and the symbols with adjusted symbol mappings (e.g., some phase rotation) may be corrected (e.g., counter rotated) prior to further decoding. Error correction at the receiver can then rely on the differential encoding of the MSBs to resolve the bit error.

Figure 8:
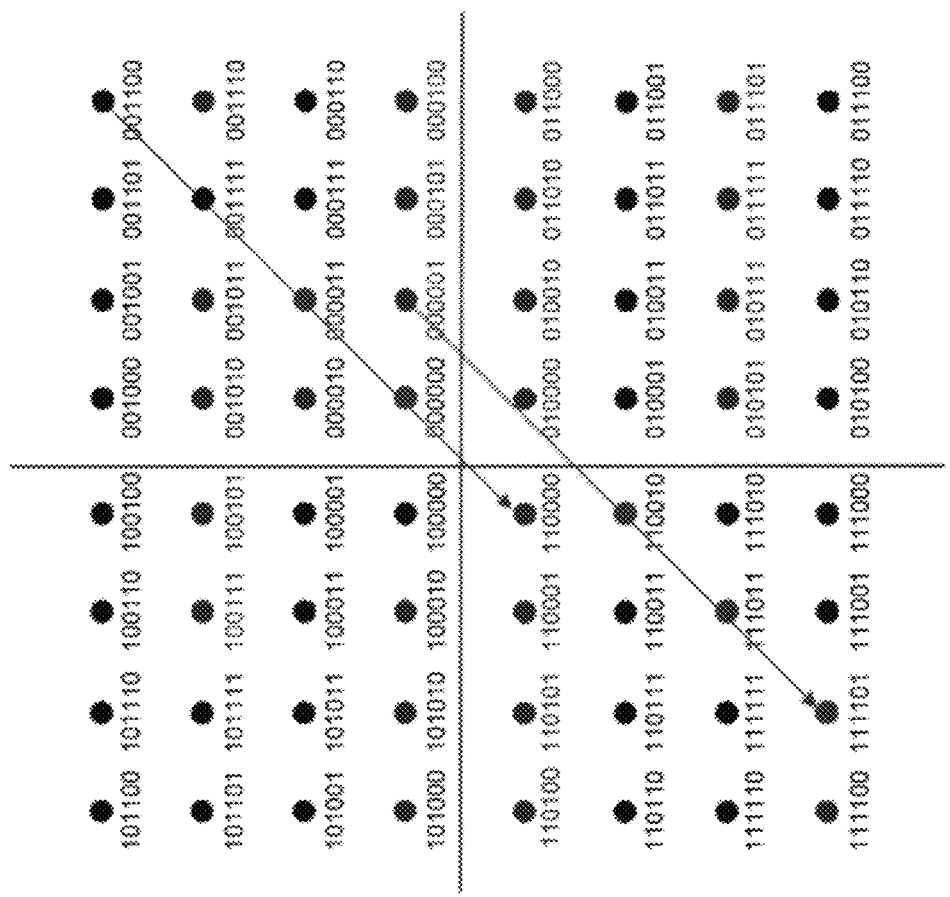
FIG. 8 is an example translational encoding scheme according to an embodiment of the present invention.

In another embodiment, as described in process 200D above, step 204D includes (instead of or in addition to adjusting the phases of one or more of the N complex symbols) performing a translational mapping of one or more of the N complex symbols. An example that illustrates translational mapping of symbols is shown in FIG. 8. FIG. 8 shows a 64-QAM constellation. Two MSBs describe the quadrant, with opposite quadrants having opposite MSB bits (00 and 11 are diagonally opposed, and 01 and 10 are diagonally opposed). The bits of symbols in opposed quadrants are related to each other by a translation (without rotation), such that, for example, a large power symbol in the upper right quadrant, when translated, is "mirrored" into a low power symbol in the lower left by inverting the four MSBs—e.g., inverting the two "quadrant" MSBs and the next two MSBs, but leaving the other bits unchanged. For example, as shown in FIG. 8, symbol "001100" (upper right of upper right hand quadrant) can be translated to symbol "110000" (upper right of lower left hand quadrant) by inverting its MSBs "0011" to "1100." According to this translational mapping scheme, peaks (or in some case significantly above-average-power groups of symbols) are detected, and the symbols are "mirrored" as shown in FIG. 8 such that high power symbols become low power symbols, and low power symbols become high power symbols. By inverting the 4 MSBs with the constellation map just described above, all the symbols with the inverted MSBs will be "mirrored" to their "catty-cornered" quadrant. Mirroring an entire group of symbols, such as a frame, often turns an above-average-power group of symbols into a below-average-power group of symbols, thereby reducing peaking. Operating on subgroups of symbols, such as detecting above-average-power for the two halves of an OFDM frame's symbols separately, and then performing the translational mapping adjustment for all symbols in either of the halves which have above-average-power, refines the operation further. As described further below, the detection and triggering of a mapping adjustment may involve other computations and thresholds than just above-average-power. By incorporating a coding scheme for the MSBs which does not contain the all 1's sequence, then as an example, the inversion of the MSBs of a group (or subgroup) of symbols, or absence of such inversion, may be detected (in addition to providing error correction on the MSBs) without other explicit signaling information in the transmitted waveform, or may be used to assist the receiver even if other signaling information is included in the transmission. In one embodiment a "last" frame may incorporate such a coding scheme for the MSBs of potentially translationally adjusted symbols, while other frames may rely on "thrown forward" signaling bits.

As would be understood by a person of skill in the art based on the teachings herein, the translation mapping scheme can be used instead of or in addition to the rotationally-invariant mapping scheme described. As such, in any of the embodiments described above using the rotationally-invariant mapping scheme, the translational mapping scheme may be used equally in the same embodiments.

In another embodiment, in accordance with process 200, step 204 includes (instead of, or in addition to, adjusting the phases of one or more of the N complex symbols) adjusting one or more bit values in one or more of the source (e.g., non-modulated, prior to modulation) symbols (from which the N complex symbols are generated). For example, this may include inserting random or defined bits (e.g., 0s) at designated bit locations in one or more of the source symbols.

Figure 4:
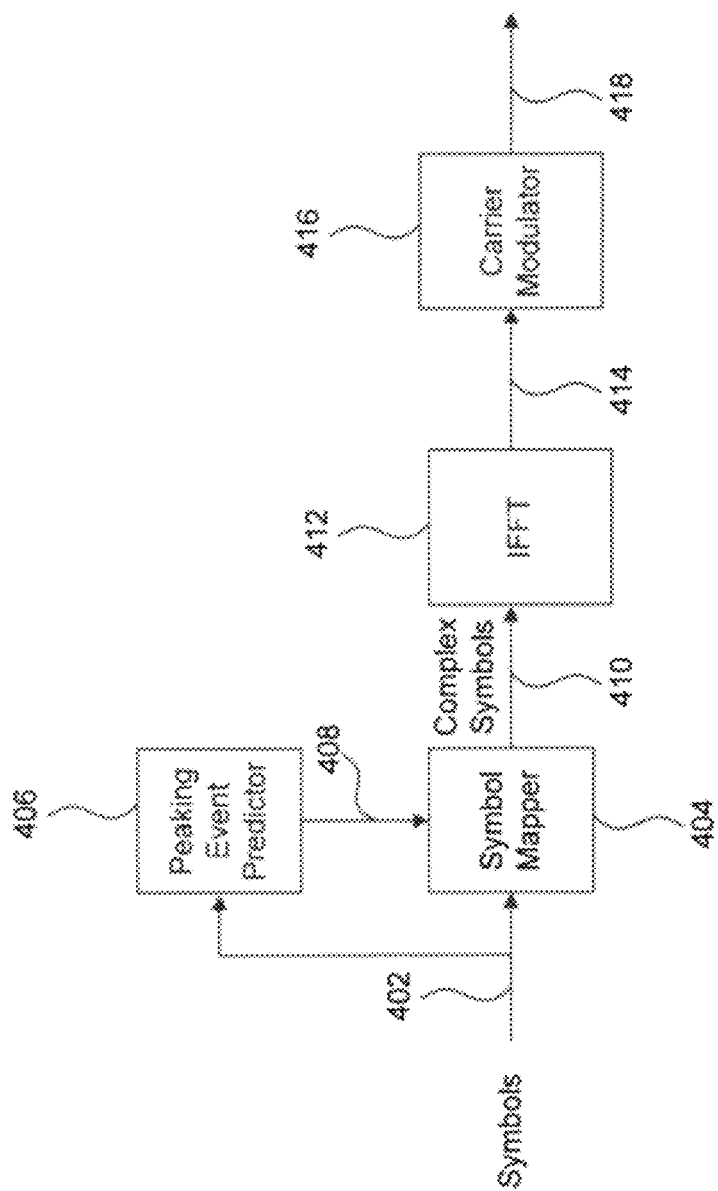
FIG. 4 is an example transmitter with high PAPR mitigation according to an embodiment of the present invention.
Figure 5:
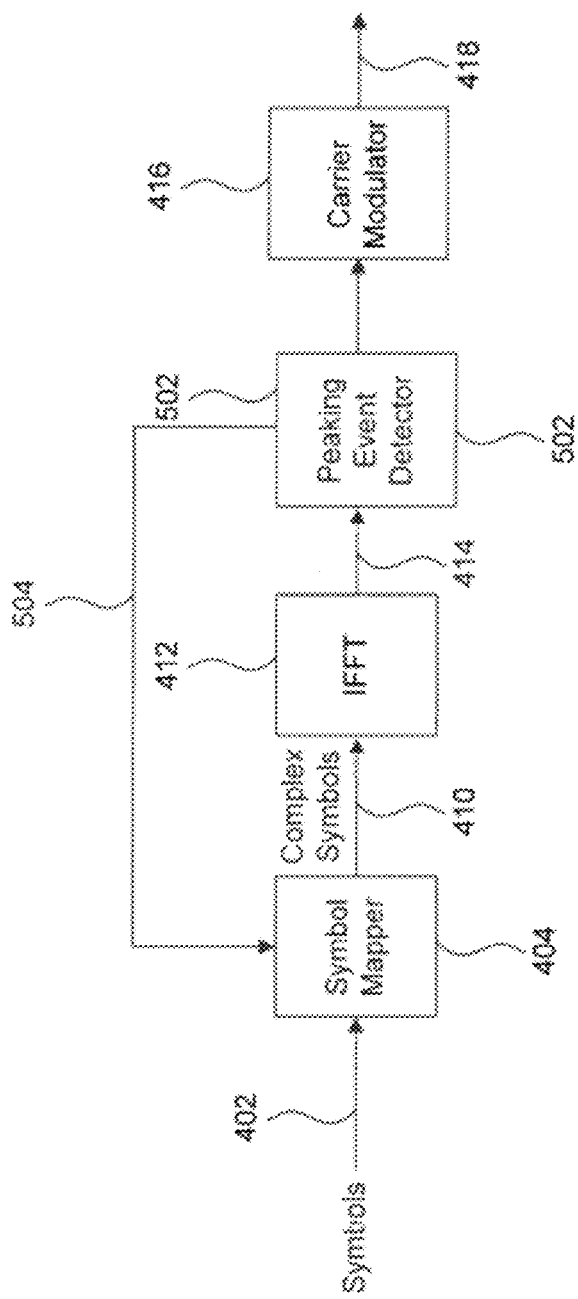
FIG. 5 is another example transmitter with high PAPR mitigation according to an embodiment of the present invention.

FIGS. 4 and 5, described below, illustrate example embodiments of transmitters capable of providing high PAPR mitigation in accordance with process 200. These examples are provided for the purpose of illustration only and are not limiting. As would be understood by a person of skill in the art based on the teachings herein, process 200 may be implemented in other ways than described herein. For ease of description, some common transmitter elements are not shown in FIGS. 4 and 5.

Referring to FIG. 4, example transmitter 400 includes a symbol mapper 404, a peaking event predictor 406, an IFFT module 412, and a carrier modulator 416.

As shown in FIG. 4, source symbols 402 (which may be FEC encoded) are input into symbol mapper 404 and peaking event predictor 406. Peaking event predictor 406 processes source symbols 402 to predict the occurrence of peaking events due to source symbols 402. In an embodiment, peaking event predictor 406 monitors source symbols 402 for known patterns capable of causing peaking events. In another embodiment, peaking event predictor performs a running arithmetic operation (e.g., addition) of source symbols 402 as they are received to make a peaking event prediction (with a certain probability). When a peaking event is predicted, peaking event predictor 406 provides a signal 408 to symbol mapper 404, indicating a predicted location of the peaking event. In OFDM, signal 408 may identify one or more tones of the OFDM symbol that are likely to be at the center of the peaking event.

Symbol mapper 404 maps source symbols 402 according to a modulation scheme (e.g., 64-QAM) to generate complex symbols 410. In addition, as described above, symbol mapper 404 may receive signal 408 from peaking event predictor 406, identifying a predicted peaking event. As such, in embodiments, symbol mapper 408 may cause complex symbols 410 to be adjusted in accordance with signal 408. For example, as described above, symbol mapper 404 may apply an appropriate phase rotation within its mapping scheme so as to adjust the phases of one or more complex symbols 410. Alternatively, or additionally, symbol mapper 404 may adjust one or more bit values in one or more of source symbols 402, prior to generating complex symbols 410.

Subsequently, complex symbols 410 are input into IFFT 412 to generate signal 414. Signal 414 may be a multi-carrier modulated signal, such as an OFDM symbol, for example. Career modulator 416 frequency modulates signal 414 according to a desired carrier frequency to generate output signal 418, which is then transmitted to the receiver.

FIG. 5 is another example transmitter 400 with high PAPR mitigation according to an embodiment of the present invention. Example transmitter 500 includes similar components as described above with respect to example transmitter 400, including a symbol mapper 404, an IFFT module 412, and a carrier modulator 416. In addition, example transmitter 500 includes a peaking event detector 502, which sits at the output of IFFT module 412. For example, as shown in FIG. 5, peaking event detector 502 may be placed between IFFT module 412 and carrier modulator 416 in the transmitter chain. Alternatively, peaking event detector 502 may be placed outside the transmitter chain.

Peaking event detector 502 analyzes the output signal 414 of IFFT module 412 to detect a peaking event in signal 414. In an embodiment, peaking event detector 502 analyzes a power density spectrum of signal 414. If no peaking event is detected, output signal 414 is sent to carrier modulator 416 for frequency modulation and subsequent transmission. Otherwise, if a peaking event is detected, output signal 414 is not transmitted, and peaking event detector 502 sends a signal 504 to symbol mapper 404, identifying the location of the detected peaking event in output signal 414.

Symbol mapper 404 uses signal 504 to adjust complex symbols 410, in substantially similar fashion as described above in FIG. 4 with respect to signal 408. For example, symbol mapper 404 may adjust the phases of one or more of complex symbols 410 in accordance with signal 504. Alternatively, of additionally, symbol mapper 404 may adjust one or more bit values in one or more of source symbols 402, prior to generating complex symbols 410. IFFT module 412 then acts on the adjusted complex symbols 410 to generate a new output signal 414. The new output signal 414 is analyzed by peaking event detector 502 as described above, and is allowed to be transmitted if no peaking event is detected.

Example embodiments for communicating information about a predicted/detected peaking event to a receiver are now provided below in FIGS. 6 and 7. These examples are provided for the purpose of illustration only and are not limiting.

Figure 6:
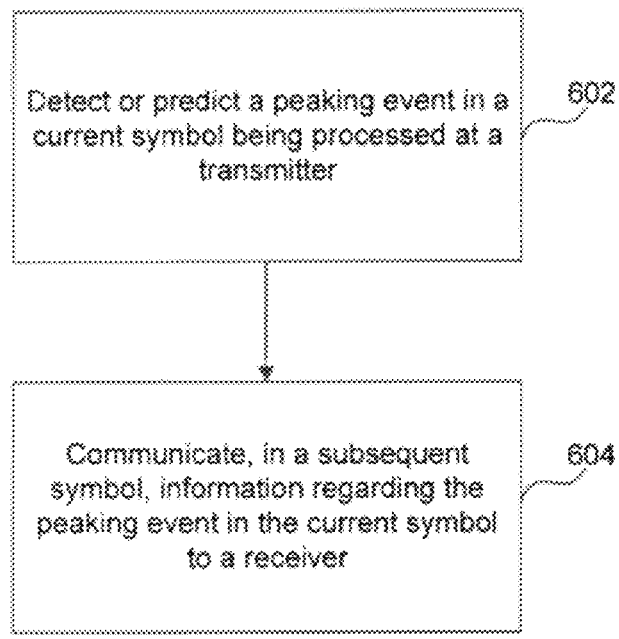
FIG. 6 is a process flowchart of a method of communicating a PAPR event from a transmitter to a receiver according to an embodiment of the present invention.

FIG. 6 is a process flowchart 600 of a method of communicating a PAPR event from a transmitter to a receiver according to an embodiment of the present invention.

Process 600 begins in step 602, which includes detecting or predicting a peaking event in a current symbol being processed at a transmitter. For example, as described above, the peaking event may be predicted from source symbols or detected from the output of an IFFT module. Thus, the peaking event is predicted or detected before the current symbol is transmitted to the receiver. In an embodiment, information regarding the peaking event (e.g., peak location, peak level, etc.) is determined and stored at the transmitter.

Subsequently, in step 604, process 600 includes communicating, in a subsequent symbol, information regarding the peaking event predicted/detected in the current symbol to the receiver. In an embodiment, the information is communicated in the immediately consecutive symbol transmitted to the receiver. Thus, according to process 600, the receiver may have to delay its processing of each received current symbol by at least one symbol time, while it waits to receive information about any peaking events in the current symbol in a subsequent symbol.

Figure 7:
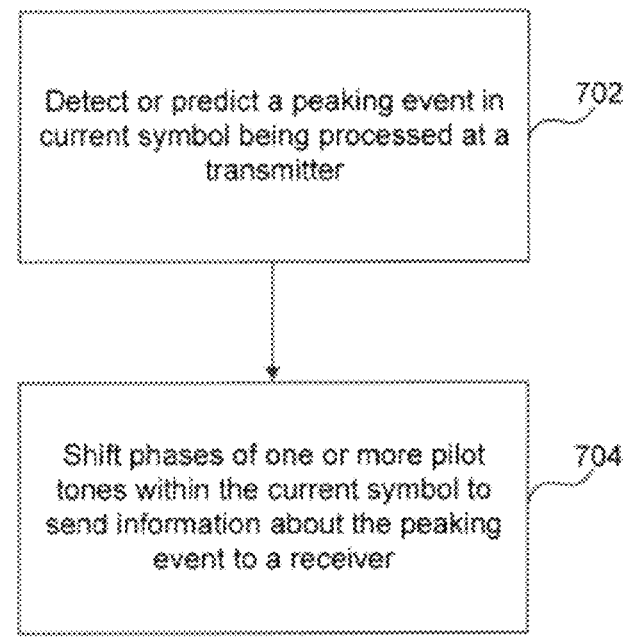
FIG. 7 is another process flowchart of a method of communicating a PAPR event from a transmitter to a receiver according to an embodiment of the present invention.

FIG. 7 is another process flowchart 700 of a method of communicating a PAPR event from a transmitter to a receiver according to an embodiment of the present invention. In contrast to process 600, process 700 communicates information regarding peaking events in a current symbol within the symbol itself, rather than a subsequent symbol.

Process 700 begins in step 702, which includes detecting or predicting a peaking event in a current symbol being processed at a transmitter. In an embodiment, information regarding the peaking event (e.g., peak location, peak level, etc.) is determined and stored at the transmitter.

Subsequently, in step 704, process 700 includes shifting phases of one or more pilot tones within the current symbol to send information about the detected/predicted peaking event. In an embodiment, the symbol (e.g., OFDM symbol) includes one or more tones which are designated to transmit fixed pilot tones. The pilot tones typically have phases that are known to the receiver and which provide a stable phase reference to the receiver. In accordance with step 704, the phases of the pilot tones are varied so as to signal to the receiver information about peaking events. In an embodiment, a signaling scheme using the phases of the pilot tones can be implemented. For example, in an embodiment, when two successive pilot tones are rotated 90 degrees, it is signaled to the receiver that all tones between the two pilot tones be rotated by 90 degrees to mitigate a peaking event. Other schemes for using pilot tones within the symbol to send information can also be used as would be understood by a person of skill in the art based on the teachings herein.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

The present invention has application to high speed data networks, including, but not limited to, wired, wireless, microwave, WiFi, satellite, cable, telecommunications, cellular, Local Area Network (LAN), Wide Area Network (WAN), Metropolitan Area Network (MAN), terrestrial, and broadcast networks, and MIMO and multi-carrier modulation systems (e.g., OFDM, OFDMA, S-CDMA, PAM, etc.) or systems using a single or a multiplex of single-carrier channels, where high peak to average power ratio (PAM) events (peaking events) occur when sub-carriers combine constructively.

What is claimed is:

1. A receiver, comprising:
    a symbol demapper configured to receive a plurality of symbols from a transmitter and to generate a respective plurality of demodulated symbols; and
    a detector configured to process a selected symbol of the plurality of demodulated symbols to determine if the selected symbol corresponds to a transition symbol, wherein a phase adjustment is introduced by the transmitter at the transition symbol without a priori knowledge of a location of the transition symbol within the plurality of demodulated symbols at the receiver, wherein the detector is configured to:
        apply a plurality of hypothesis phase rotations to the selected symbol resulting in a plurality of rotated selected symbols, the plurality of hypothesis phase rotations including a 0 degree phase rotation; and
        evaluate a check sum of error coding bits in each of the plurality of rotated selected symbols to determine if the selected symbol corresponds to the transition symbol, wherein at least one of the hypothesis phase rotations corresponds to the phase adjustment introduced by the transmitter at the transition symbol.

2. The receiver of claim 1, wherein the selected symbol corresponds to the transition symbol, and wherein the detector is further configured to determine an amount of the phase adjustment introduced by the transmitter at the transition symbol.

3. The receiver of claim 1, wherein the detector is further configured to determine whether or not an alternative constellation mapping is applied at the selected symbol by the transmitter.

4. The receiver of claim 1, wherein the detector is further configured to determine whether or not a constellation translation is applied at the selected symbol by the transmitter.

5. The receiver of claim 1, wherein the detector is further configured to determine whether or not a constellation rotation is applied at the selected symbol by the transmitter.

6. The receiver of claim 1, wherein the detector is further configured to test one or more phase adjustment hypotheses at the selected symbol.

7. The receiver of claim 1, wherein a type of the phase adjustment introduced by the transmitter is known by the receiver.

8. The receiver of claim 1, wherein a type of the phase adjustment or an amount of the phase adjustment is provided to the receiver by the transmitter.

9. The receiver of claim 8, wherein the type of the phase adjustment or the amount of the phase adjustment is provided to the receiver using signaling bits.

10. The receiver of claim 9, wherein the signaling bits are invariant to the phase adjustment introduced by the transmitter.

11. The receiver of claim 8, wherein the amount of the phase adjustment is provided to the receiver using pilot tone phase adjustment at the transmitter.

12. A method performed by a receiver, comprising:
    receiving a plurality of symbols from a transmitter;

generating a plurality of demodulated symbols from the plurality of symbols;

processing a selected symbol of the plurality of demodulated symbols to determine if the selected symbol corresponds to a transition symbol, wherein a phase adjustment is introduced by the transmitter at the transition symbol without a priori knowledge of a location of the transition symbol within the plurality of demodulated symbols at the receiver, wherein the processing comprises:

applying a plurality of hypothesis phase rotations to the selected symbol resulting in a plurality of rotated selected symbols, the plurality of hypothesis phase rotations including a 0 degree phase rotation; and evaluating a check sum of error coding bits in each of the plurality of rotated selected symbols to determine if the selected symbol corresponds to the transition symbol, wherein at least one of the hypothesis phase rotations corresponds to the phase adjustment introduced by the transmitter at the transition symbol.

13. The method of claim 12, wherein the selected symbol corresponds to the transition symbol, the method further comprising:

determining an amount of the phase adjustment introduced by the transmitter at the transition symbol.

14. The method of claim 12, wherein said processing comprises:

determining whether or not an alternative constellation mapping is applied at the selected symbol by the transmitter.

15. The method of claim 12, wherein said processing comprises:

determining whether or not a constellation translation is applied at the selected symbol by the transmitter.

16. The method of claim 12, wherein said processing comprises:

determining whether or not a constellation rotation is applied at the selected symbol by the transmitter.

17. The method of claim 12, wherein said processing comprises:

testing one or more phase adjustment hypotheses at the selected symbol.

18. The method of claim 12, further comprising:

receiving, from the transmitter, a type of the phase adjustment or an amount of the phase adjustment.

19. A method performed by a receiver, comprising:

receiving a plurality of symbols from a transmitter;

generating a plurality of demodulated symbols from the plurality of symbols;

identifying a selected symbol of the plurality of demodulated symbols; and processing the selected symbol to determine if the selected symbol corresponds to a transition symbol, wherein a phase adjustment is introduced by the transmitter at the transition symbol without a priori knowledge of a location of the transition symbol within the plurality of demodulated symbols at the receiver, wherein the processing comprises:

applying a plurality of hypothesis phase rotations to the selected symbol resulting in a plurality of rotated selected symbols, the plurality of hypothesis phase rotations including a 0 degree phase rotation; and evaluating a check sum of error coding bits in each of the plurality of rotated selected symbols to determine if the selected symbol corresponds to the transition symbol, wherein at least one of the hypothesis phase rotations corresponds to the phase adjustment introduced by the transmitter at the transition symbol.

20. The method claim 19, wherein processing the selected symbol comprises:

processing a pilot tone from the transmitter to determine an amount of the phase adjustment at the selected symbol.

* * * * *